US008135141B2

(12) United States Patent
Shiba

(10) Patent No.: US 8,135,141 B2
(45) Date of Patent: Mar. 13, 2012

(54) AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

(75) Inventor: Kenji Shiba, Tokyo (JP)

(73) Assignee: Sony Corporation, Tokyo (JP)

(*) Notice: Subject to any disclaimer, the term of this patent is extended or adjusted under 35 U.S.C. 154(b) by 815 days.

(21) Appl. No.: 12/229,878

(22) Filed: Aug. 27, 2008

(65) Prior Publication Data

US 2009/0060206 A1 Mar. 5, 2009

(30) Foreign Application Priority Data

Aug. 31, 2007 (JP) ................................ 2007-225757

(51) Int. Cl.
*H04B 3/00* (2006.01)

(52) U.S. Cl. .................. 381/77; 381/2; 381/79; 381/80; 381/82

(58) Field of Classification Search ................ 381/2, 77, 381/79, 80, 82, 300
See application file for complete search history.

(56) References Cited

U.S. PATENT DOCUMENTS

| | | | | |
|---|---|---|---|---|
| 5,406,634 | A | 4/1995 | Anderson et al. | |
| 2004/0096074 | A1 | 5/2004 | Bontempi et al. | |
| 2004/0223622 | A1* | 11/2004 | Lindemann et al. | 381/79 |
| 2005/0177256 | A1 | 8/2005 | Shintani et al. | |
| 2009/0060219 | A1 | 3/2009 | Inohara | |
| 2009/0060220 | A1 | 3/2009 | Shiba | |

FOREIGN PATENT DOCUMENTS

| | | | |
|---|---|---|---|
| JP | 09-259539 | A | 10/1997 |
| JP | 2001-359200 | A | 12/2001 |
| JP | 2003-109298 | A | 4/2003 |
| JP | 2004-260281 | A | 9/2004 |
| JP | 2005-012534 | A | 1/2005 |
| JP | 2005-210504 | A | 8/2005 |
| JP | 2006-101081 | A | 4/2006 |
| JP | 2006-101496 | A | 4/2006 |
| JP | 2007-027928 | | 2/2007 |
| JP | 2008-035400 | A | 2/2008 |

* cited by examiner

*Primary Examiner* — Dung A. Le

(74) *Attorney, Agent, or Firm* — Wolf, Greenfield & Sacks, P.C.

(57) ABSTRACT

There is provided an audio signal transmitting apparatus including: a channel mapping unit which determines the audio signals allocated to each of the channels and generates channel mapping information representing types of the audio signals allocated to each of the channels; an audio signal transmitting unit which transmits the audio signals allocated to each of the channels by the channel mapping unit to the external connection apparatuses by a first transmitting scheme or a second transmitting scheme; and a connection management information providing unit which provides connection management information including the channel mapping information and transmitting scheme information representing the transmitting scheme of the audio signals to the external connection apparatuses.

25 Claims, 17 Drawing Sheets

FIG.6A

| | | |
|---|---|---|
| CH1 | No.1 | MAIN CHANNEL 1 (L) |
| | No.2 | MAIN CHANNEL 1 (R) |
| CH2 | No.3 | SUB-CHANNEL 1 |
| | No.4 | SUB-CHANNEL 2 |
| CH3 | No.5 | SUB-CHANNEL 3 |
| | No.6 | SUB-CHANNEL 4 |
| CH4 | No.7 | SUB-CHANNEL 5 |
| | No.8 | SUB-CHANNEL 6 |

FIG.6B

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

FIG.15A

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | SURROUND REAR (L) |
| | No.6 | SURROUND REAR (R) |
| CH4 | No.7 | UNUSED |
| | No.8 | UNUSED |

CONNECT SURROUND BACK SPEAKER

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | SURROUND REAR (L) |
| | No.6 | SURROUND REAR (R) |
| CH4 | No.7 | SURROUND BACK (L) |
| | No.8 | SURROUND BACK (R) |

FIG.15B

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | SURROUND REAR (L) |
| | No.8 | SURROUND REAR (R) |

CONNECT SURROUND BACK SPEAKER

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | SURROUND BACK (L) |
| | No.6 | SURROUND BACK (R) |
| CH4 | No.7 | SURROUND REAR (L) |
| | No.8 | SURROUND REAR (R) |

AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

CROSS-REFERENCE TO RELATED APPLICATION

The present invention contains subject matter related to Japanese Patent Application JP 2007-225757 filed in the Japan Patent Office on Aug. 31, 2007, the entire contents of which being incorporated herein by reference.

BACKGROUND OF THE INVENTION

1. Field of the Invention

The present invention relates an audio signal transmitting apparatus, an audio signal receiving apparatus, an audio signal transmission system, an audio signal transmission method, and a program.

2. Description of the Related Art

In recent years, with popularization of a home theater system and development of an information transmission technique, a technique that transmits an audio signal by using a plurality of channels has been actively used. In a system (audio signal transmission system) such as the home theater system which transmits an audio signal, an apparatus (transmitting apparatus) which transmits an audio signal and an apparatus (receiving apparatus) which receives an audio signal are often connected to each other through various connection cables.

In order to increase the degree of freedom of a layout of a plurality of loudspeakers configuring a home theater system, a so-called wireless connection between a transmitting apparatus which provides a sound source and a loudspeaker serving as a receiving apparatus has been attempted without using a connection cable (for example, see Japanese Patent Application Laid-Open No. 2007-27928).

SUMMARY OF THE INVENTION

In general, a transmitting apparatus transmits audio signals to receiving apparatuses through a plurality of channels serving as audio signal transmission paths. Up to now, allocation of the audio signals to the channels can hardly be changed. For this reason, even though an audio signal of a specific type (for example, a signal in a surround system) is not used, allocation of channels can hardly be changed, and channels included in a transmitting apparatus can hardly be effectively used.

Therefore, the present invention has been made in consideration, and it is desirable to effectively use a channel included in a transmitting apparatus by changing allocation of audio signals to channels in an audio signal transmitting apparatus, an audio signal receiving apparatus, an audio signal transmission system, an audio signal transmission system, and a program.

According to an embodiment of the present invention, there is provided an audio signal transmitting apparatus which transmits audio signals to external connection apparatuses through a plurality of channels, including: a channel mapping unit which determines the audio signals allocated to each of the channels and generates channel mapping information representing types of the audio signals allocated to each of the channels; an audio signal transmitting unit which transmits the audio signals allocated to each of the channels by the channel mapping unit to the external connection apparatuses by a first transmitting scheme or a second transmitting scheme; and a connection management information providing unit which provides connection management information including the channel mapping information and transmitting scheme information representing the transmitting scheme of the audio signals to the external connection apparatuses, and wherein the plurality of audio signals acquired from one audio source includes one main signal and one or two or more surround signals corresponding to a surround component of an audio output obtained by the main signal, the first transmitting scheme is a transmitting scheme which allocates the surround signal to at least one of the channels to transmit the surround signal, and the second transmitting scheme is a transmitting scheme which allocates only the main signals to some or all of the plurality of channels to transmit the main signals.

The channel mapping unit may include: a transmitting scheme selecting unit which selects any one of the first transmitting scheme and the second transmitting scheme depending on a type of the external connection apparatus which can output the audio signal transmitted by the audio signal transmitting unit; a channel allocating unit which allocates the surround signal to at least one of the channels when the first transmitting scheme is selected by the transmitting scheme selecting unit, and allocates only the main signal to some or all of the plurality of channels when the second transmitting scheme is selected by the transmitting scheme selecting unit; and a channel mapping information generating unit which generates the channel mapping information on the basis of a result of allocation of the audio signal to each of the channels by the channel allocating unit.

The audio signal transmitting apparatus further includes a connection state managing unit having a apparatus type information acquiring unit which acquires apparatus type information representing whether the external connection apparatus is a main apparatus which can output the main signal or surround apparatuses of one type or two or more types which can output the surround signal, a connection apparatus information generating unit which generates connection apparatus information including the number or types of external connection apparatuses which can output the audio signal transmitted by the audio signal transmitting unit on the basis of the apparatus type information, and a connection state determining unit which determines whether the surround apparatus which can output the audio signal transmitted by the audio signal transmitting unit is present on the basis of the connection apparatus information, the transmitting scheme selecting unit may select the first transmitting scheme when the connection state managing unit determines that the surround apparatus is present, and the transmitting scheme selecting unit may select the second transmitting scheme when the connection state managing unit determines that the surround apparatus is absent.

When the first transmitting scheme is selected by the transmitting scheme selecting unit, the connection state determining unit supplies the connection apparatus information acquired from the connection apparatus information generating unit to the channel allocating unit, and the channel allocating unit may preferentially allocate one or two or more of the surround signals which can be output by the surround apparatuses depending on the number of surround apparatuses which can output the audio signals transmitted by the audio signal transmitting unit and included in the connection apparatus information.

The connection state managing unit may further have a connection state receiving unit which receives a connection state notification signal representing whether the external connection apparatus is connected to the audio signal transmitting apparatus from the external connection apparatus at a predetermined timing.

The connection state managing unit further has a connection confirmation signal transmitting unit which transmits a connection confirmation signal which confirms whether the external connection apparatus is connected to the audio signal transmitting apparatus to all the external connection apparatuses connected to the audio signal transmitting apparatus, and the connection state receiving unit may receive the connection state notification signal representing that the external connection apparatus is connected to the audio signal transmitting apparatus from the external connection apparatus which responds to the connection confirmation signal.

The connection confirmation signal transmitting unit may periodically transmit the connection confirmation signal.

The predetermined timing may be a timing when a power supply of the external connection apparatus is turned on.

The predetermined timing may be a timing when the power supply of the external connection apparatus is turned off.

The channel allocating unit may allocate the surround signals to the channels the number of which is equal to the number of surround apparatuses which can output the audio signals transmitted by the audio signal transmitting unit and may allocate the main signal to the channel to which the surround signal is not allocated.

The channel allocating unit, when a new surround signal is allocated to the channel, on the basis of the channel mapping information acquired from the channel mapping information generating unit, may determine the presence/absence of an idle channel serving as the channel to which the audio signal is not allocated, and may allocate the new surround signal to one of the channels to which the main signal is allocated when it is determined that the idle channel is absent.

The audio signal transmitting apparatus further includes a channel managing unit which, when a plurality of main channels are the channels to which the main signals are allocated, on the basis of the connection apparatus information acquired from the connection apparatus information generating unit, confirms the number of main apparatuses which output the audio signals transmitted from the main channels and notifies the channel allocating unit of the channel having the smallest number of main apparatuses, and the channel allocating unit may allocate the new surround signal to the channel of which is notified by the channel managing unit.

The audio signal transmitting apparatus further includes a channel managing unit which changes the number of channels depending on a request from the channel allocating unit, the channel allocating unit, when the new surround signal is allocated to the channel, on the basis of the channel mapping information acquired from the channel mapping information generating unit, determines the presence/absence of an idle channel serving as the channel to which the audio signal is not allocated, and requests the channel managing unit to increase the number of channels when it is determined that the idle channel is absent, and the channel managing unit may increase the number of channels depending on a request from the channel allocating unit.

When the connection state receiving unit receives the connection state notification signal representing that the external connection apparatus is connected to the audio signal transmitting apparatus from the external connection apparatus, the connection state determining unit determines whether the surround apparatuses which can output the audio signals transmitted by the audio signal transmitting unit includes a channel-unallocated apparatus in which the audio signals which can be output are not allocated to any one of the plurality of channels, and the channel allocating unit, when the connection state determining unit determines that the channel-unallocated apparatus is present, may preferentially allocate the surround signal which can be output by the channel-unallocated apparatus to the channel.

The channel allocating unit may allocate the main signal to at least one of the channels.

According to another embodiment of the present invention, there is provided an audio signal receiving apparatus which receives audio signals transmitted from external connection apparatus through a plurality of channels, including: a connection management information acquiring unit which acquires connection management information including channel mapping information representing types of the audio signals allocated to each of the channels and transmitting scheme information representing a transmitting scheme of the audio signals by the external connection apparatuses from the external connection apparatus; a connection permission/nonpermission determining unit which determines, on the basis of the transmitting scheme information, whether the transmitting scheme is a scheme in which the audio signal receiving apparatus is connected to the external connection apparatuses; an audio signal receiving unit which receives the audio signals from the external connection apparatuses when the connection permission/nonpermission determining unit determines that the transmitting scheme is the scheme in which the audio signal receiving apparatus is connected to the external connection apparatuses; and an audio signal output unit which selects and outputs the audio signals which can be output on the basis of the channel mapping information.

The plurality of audio signals acquired from one audio source include one main signal and one or two surround signals corresponding to a surround component of an audio output obtained by the main signal, and the audio signal transmitting apparatus may include a apparatus type information providing unit which provides apparatus type information representing whether the audio signal transmitting apparatus is a main apparatus which can output the main signal or surround apparatus of one type or two or more types which can output the surround signals.

The audio signal receiving apparatus may further include a connection state transmitting unit which transmits a connection state notification signal representing whether the audio signal receiving apparatus is connected to the external connection apparatus at a predetermined timing.

The audio signal receiving apparatus further includes a connection confirmation signal receiving unit which receives a connection confirmation signal which confirms whether the audio signal receiving apparatus is connected to the external connection apparatus from the external connection apparatus, and the connection state transmitting unit may transmit the connection state notification signal representing that the audio signal receiving apparatus is connected to the external connection apparatus as a response to the connection confirmation signal.

The predetermined timing may be a timing when a power supply of the audio signal receiving apparatus is turned on.

The predetermined timing may be a timing when the power supply of the audio signal receiving apparatus is turned off.

According to still another embodiment of the present invention, there is provided an audio signal transmission system which includes an audio signal transmitting apparatus which transmits audio signals to external connection apparatuses through a plurality of channels and an audio signal receiving apparatus which receives the audio signals transmitted from the audio signal transmitting apparatus, wherein an audio signal transmitting apparatus includes: a channel mapping unit which determines the audio signals allocated to each of the channels and generates channel mapping information representing types of the audio signals allocated to each of the channels; an audio signal transmitting unit which transmits the audio signals allocated to each of the channels by the channel mapping unit to the external connection apparatuses by a first transmitting scheme or a second transmitting scheme; and a connection management information providing unit which provides connection management information including the channel mapping information and transmitting scheme information representing the transmitting scheme of the audio signals to the external connection apparatuses, the audio signal receiving apparatus includes: a connection management information acquiring unit which acquires connection management information including channel mapping information representing types of the audio signals allocated to each of the channels and transmitting scheme information representing a transmitting scheme of the audio signals by the external connection apparatuses from the audio signal transmitting apparatus; a connection permission/nonpermission determining unit which determines, on the basis of the transmitting scheme information, whether the transmitting scheme is a scheme in which the audio signal receiving apparatus is connected to the external connection apparatuses; an audio signal receiving unit which receives the audio signals from the external connection apparatuses when the connection permission/nonpermission determining unit determines that the transmitting scheme is the scheme in which the audio signal receiving apparatus is connected to the external connection apparatuses; and an audio signal output unit which selects and outputs the audio signals which can be output from the received audio signals on the basis of the channel mapping information, the plurality of audio signals acquired from one audio source includes one main signal and one or two or more surround signals corresponding to a surround component of an audio output obtained by the main signal, the first transmitting scheme is a transmitting scheme which allocates the surround signal to at least one of the channels to transmit the surround signal, and the second transmitting scheme is a transmitting scheme which allocates only the main signals to some or all of the plurality of channels to transmit the main signals.

According to still another embodiment of the present invention, there is provided an audio signal transmission method in an audio signal transmission system which includes an audio signal transmitting apparatus which transmits audio signals to external connection apparatuses through a plurality of channels and an audio signal receiving apparatus which receives the audio signals transmitted from the audio signal transmitting apparatus, including the steps of: causing the audio signal transmitting apparatus to determine the audio signals allocated to each of the channels; causing the audio signal transmitting apparatus to generate channel mapping information representing types of the audio signals allocated to each of the channels; causing the audio signal transmitting apparatus to provide connection management information including the channel mapping information and transmitting scheme information representing a transmitting scheme of the audio signal; causing the audio signal receiving apparatus to determine whether the transmitting scheme is a scheme in which the audio signal receiving apparatus can be connected to the audio signal transmitting apparatus on the basis of the transmitting scheme information; causing the audio signal transmitting apparatus to transmit the audio signals allocated to each of the channels by the channel mapping unit to the external connection apparatus by a first transmitting scheme or a second transmitting scheme, when it is determined that the transmitting scheme is the scheme in which the audio signal receiving apparatus can be connected to the audio signal transmitting apparatus; causing the audio signal receiving apparatus to receive the audio signals from the audio signal transmitting apparatus; and causing the audio signal receiving apparatus to select the audio signal which can be output from the received audio signals and to output the audio signal on the basis of the channel mapping information.

According to still another embodiment of the present invention, there is provided a program to cause a computer to function as an audio signal transmitting apparatus which transmits audio signals to external connection apparatuses through a plurality of channels, causing the computer to realize: a channel mapping function that determines the audio signals allocated to each of the channels and generates channel mapping information representing types of the audio signals allocated to each of the channels; an audio signal transmitting function that transmits the audio signals allocated to each of the channels by the channel mapping function to the external connection apparatus by a first transmitting scheme or a second transmitting scheme; and a connection management information providing function that provides connection management information including the channel mapping information and transmitting scheme information representing a transmitting scheme of the audio signals to the external connection apparatus.

According to the configuration, the computer program is stored in a storage unit included in the computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network without using a recording medium.

According to still another embodiment of the present invention, there is provided a program to cause a computer to function as an audio signal receiving apparatus which receives audio signals transmitted from external connection apparatuses through a plurality of channels, causing the computer to realize: a connection management information acquiring function that acquires connection management information including channel mapping information representing types of the audio signals allocated to each of the channels and transmitting scheme information representing a transmitting scheme of the audio signals obtained by the external connection apparatuses from the external connection apparatuses; a connection permission/nonpermission determining function that determines whether the transmitting scheme is a scheme in which the audio signal receiving apparatus can be connected to the external connection apparatus on the basis of the transmitting scheme information; an audio signal receiving function that, when the connection permission/nonpermission determining unit determines that the transmitting scheme is the scheme in which the audio signal receiving apparatus can be connected to the external connection apparatus, receives the audio signals from the external connection apparatuses; and an audio signal output function that selects the audio signal which can be output on the basis of the channel mapping information and outputs the signal.

According to the configuration, the computer program is stored in a storage unit included in a computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network by using the recording medium.

According to the embodiments of the present invention, in the audio signal transmitting apparatus, the audio signal receiving apparatus, the audio signal transmission system, the audio signal transmission method, and the program, since allocation of audio signals to channels can be changed, the channels held by the transmitting apparatus can be effectively used.

BRIEF DESCRIPTION OF THE DRAWINGS

FIG. 6A is an explanatory diagram for explaining an example of channel mapping information according to the embodiment;

FIG. 6B is an explanatory diagram for explaining an example of the channel mapping information according to the embodiment;

FIG. 15A is an explanatory diagram for explaining a modification of the channel mapping information according to the embodiment;

FIG. 15B is an explanatory diagram for explaining a modification of the channel mapping information according to the embodiment;

DETAILED DESCRIPTION OF THE PREFERRED EMBODIMENTS

Figure 1:
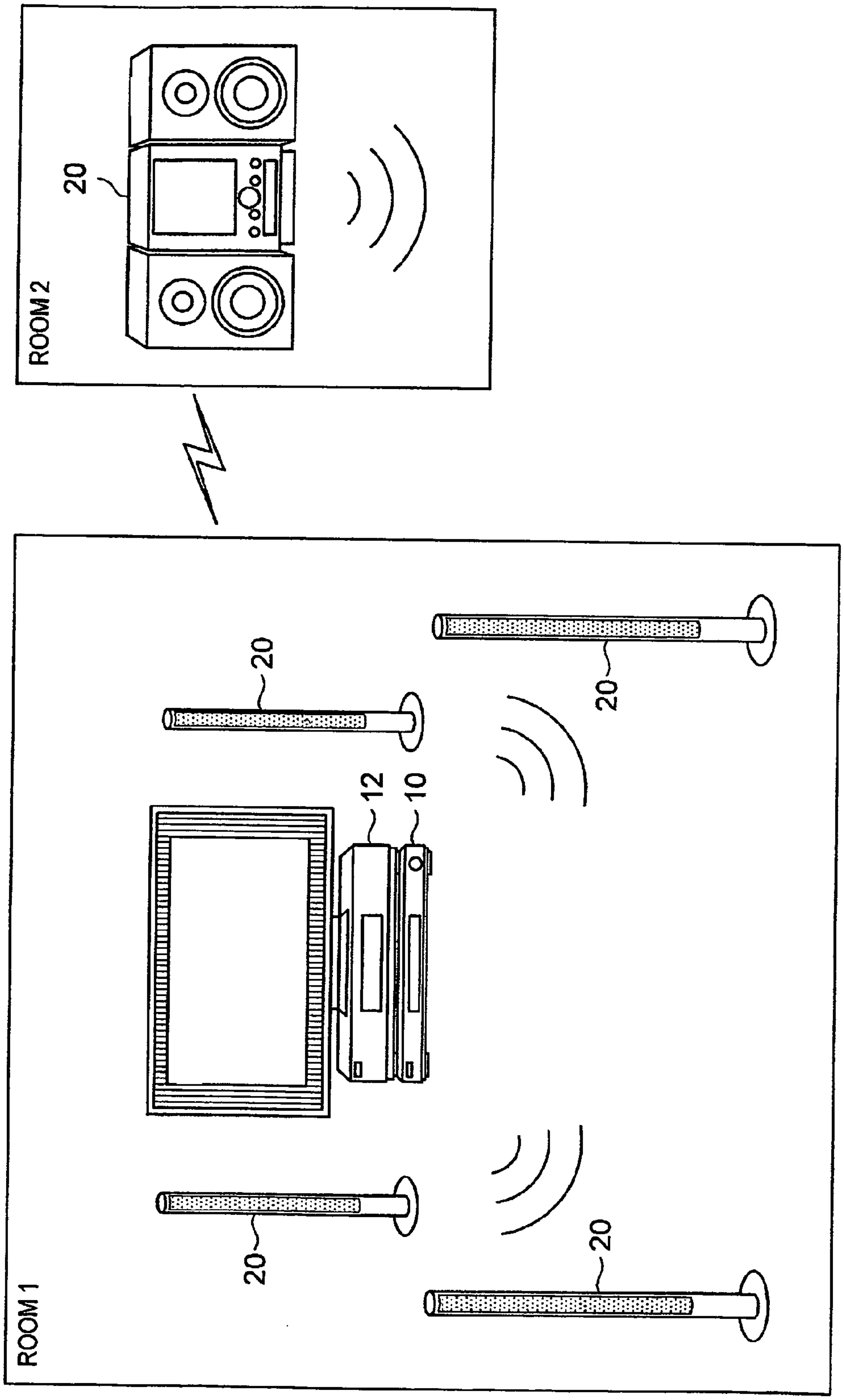
FIG. 1 is an explanatory diagram for explaining an entire configuration of an audio signal transmission system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Outline of Audio Signal Transmission System 1

An outline of an audio signal transmission system 1 according to a first embodiment of the present invention will be described below in detail with reference to FIG. 1. FIG. 1 is an explanatory diagram showing an entire configuration of the audio signal transmission system 1 according to the embodiment.

As shown in FIG. 1, the audio signal transmission system 1 according to the embodiment includes an audio signal transmitting apparatus 10 and audio signal receiving apparatuses 20.

The audio signal transmitting apparatus 10 transmits an audio signal to an audio signal receiving apparatus 20 serving as an external connection apparatus by wired transmission or wireless transmission through a plurality of channels which are transmission paths thereof and receives various pieces of information transmitted from the audio signal receiving apparatus 20. FIG. 1 shows an example in which an audio signal is wirelessly transmitted. The audio signal transmitting apparatus 10 may acquire an audio signal to be wirelessly transmitted from an audio signal output apparatus 12 such as a DVD player or a Blu-ray disk (to be abbreviated as a BD hereinafter), and the audio signal transmitting apparatus 10 itself may have a function of the audio signal output apparatus. The audio signal transmitting apparatus 10 and the audio signal receiving apparatus 20 perform transmission of an audio signal or interactive data communication of various pieces of information by using, for example, a radio wave band. For this reason, the audio signal transmitting apparatus 10 and the audio signal receiving apparatus 20, as shown in FIG. 1, may be arranged in the same room (ROOM 1), or may be separately arranged in different rooms (ROOM 1 and ROOM 2), respectively.

The audio signal receiving apparatus 20 receives an audio signal transmitted by the audio signal transmitting apparatus 10 and transmits information related to a apparatus type of the audio signal receiving apparatus 20 and various pieces of information such as a notice of a connection state between the audio signal receiving apparatus 20 and the audio signal transmitting apparatus 10 to the audio signal transmitting apparatus 10. The audio signal receiving apparatus 20 may be a surround speaker group wirelessly connected to the audio signal transmitting apparatus 10 as shown in ROOM 1 in FIG. 1, or an audio signal output apparatusesuch as an audio component which outputs an audio signal transmitted from the audio signal transmitting apparatus 10 as shown in ROOM 2 in FIG. 1. The audio signal receiving apparatus 20 may be an audio signal acquiring apparatusesuch as headphones or an earphone.

In the audio signal transmission system 1 according to the embodiment, the audio signal transmitting apparatus 10 confirms the presence/absence of the audio signal receiving apparatus 20 connected to the audio signal transmitting apparatus 10 at predetermined time intervals. When a power supply of the audio signal receiving apparatus 20 is turned on/off or when a new external connection apparatusesuch as headphones is connected to the audio signal receiving apparatus 20 to change an output state of an audio signal, the audio signal receiving apparatus 20 transmits information representing the effect to the audio signal transmitting apparatus 10. For this reason, the audio signal transmitting apparatus 10 can automatically recognize various operations performed in the audio signal receiving apparatus 20. Since interactive data communication can be performed between the audio signal transmitting apparatus 10 and the audio signal receiving apparatus 20, depending on a apparatus type of the audio signal receiving apparatus 20 connected to the audio signal transmitting apparatus 10, allocation of the channels of the audio signal transmitting apparatus 10 can be changed.

In the above explanation, the audio signal transmitting apparatus 10 and the audio signal receiving apparatus 20 are wirelessly connected to each other through wireless connection (radio wave or the like) in, for example, a predetermined band. However, the present invention is not limited to the above case. For example, the audio signal transmitting apparatus 10 and the audio signal receiving apparatus 20 may be connected to each other by Power Line Communications (PLC) or the like.

Configurations of the audio signal transmitting apparatus 10 and the audio signal receiving apparatus 20 which configure the audio signal transmission system 1 described above will be described below in detail.

(Hardware Configuration of Audio Signal Transmitting Apparatus 10)

Figure 2:
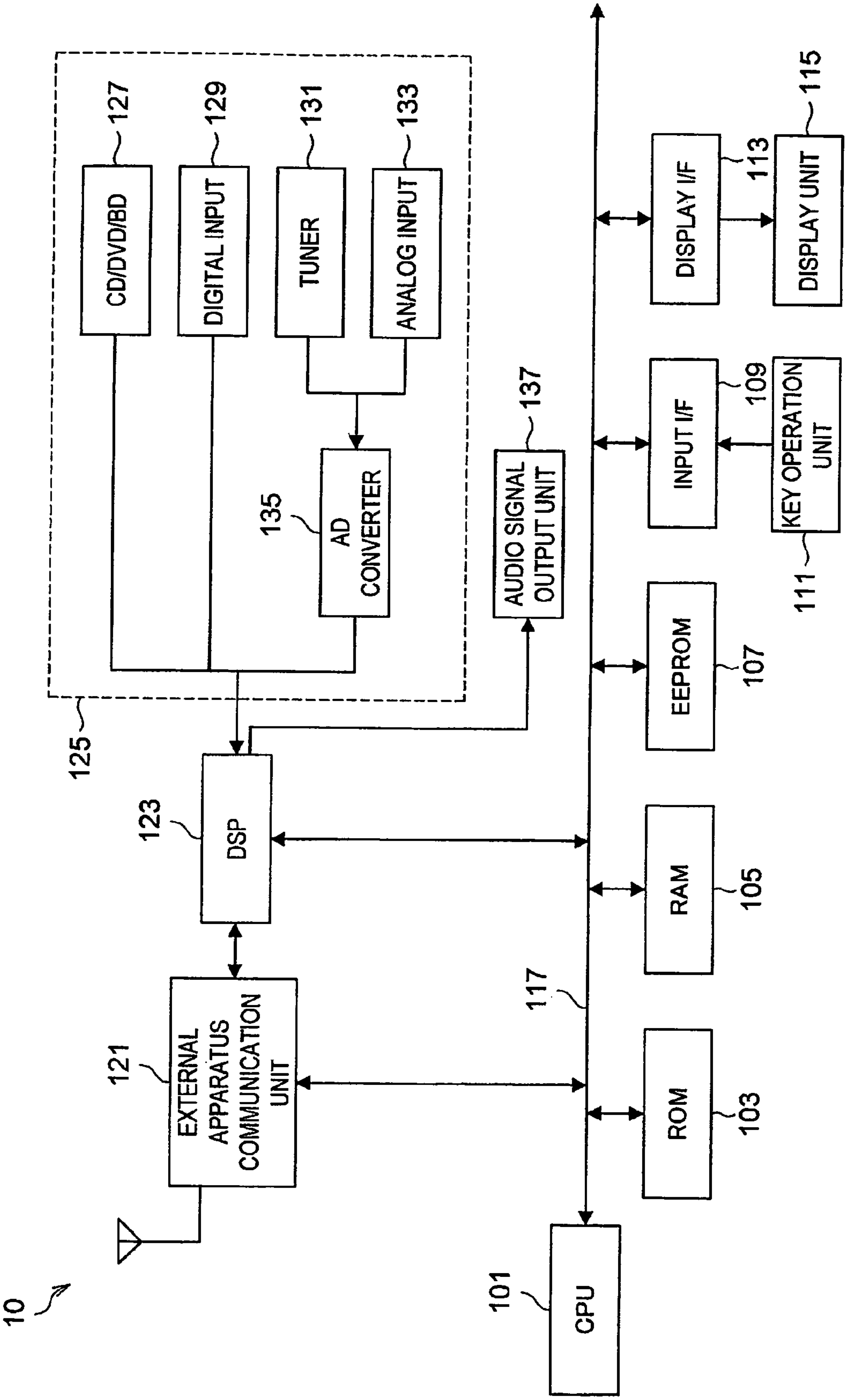
FIG. 2 is a block diagram showing a hardware configuration of an audio signal transmitting apparatus according to the embodiment.

A hardware configuration of the audio signal transmitting apparatus 10 according to the embodiment will be described below with reference to FIG. 2. FIG. 2 is a block diagram showing the hardware configuration of the audio signal transmitting apparatus 10 according to the embodiment.

As shown in FIG. 2, the audio signal transmitting apparatus 10 according to the embodiment includes a CPU (Central Processing Unit) 101, an ROM (Read Only Memory) 103, a RAM (Random Access Memory) 105, an EEPROM (Electronically Erasable and Programmable Read Only Memory) 107, an input interface (I/F) 109, a display interface (I/F) 113, and an external apparatus communication unit 121.

A DSP (Digital Signal Processor) 123 is connected to the external apparatus communication unit 121.

The CPU 101 functions as an arithmetic processing unit and a control unit and controls an entire operation or a part of the operation in the audio signal transmitting apparatus 10 according to various programs recorded on the ROM 103, the RAM 105, the EEPROM 107, and the like. The ROM 103 and the EEPROM 107 store a program, an operation parameter, and the like used by the CPU 101. The RAM 105 temporarily stores a program used in execution of the CPU 101, a parameter properly changed in the execution, and the like. These components are connected to each other by a host bus including an internal bus such as a CPU bus and a system bus 117 including an external bus such as a PCI (Peripheral Component Interconnect/Interface) bus.

The input interface 109 is an interface which includes an input control circuit or the like which generates an input signal on the basis of information input by user by means of the key operation unit 111 and outputs the input signal to the CPU 101. The user of the audio signal transmitting apparatus 10 can input various data or designate a processing operation to the audio signal transmitting apparatus 10 by operating the key operation unit 111 described below.

The key operation unit 111 is an operation unit which inputs various data or designates a processing operation to the audio signal transmitting apparatus 10. The key operation unit 111, for example, is an operation unit such as a mouse, a keyboard, a touch panel, a button, a switch, or a lever which operated by a user. The key operation unit 111, for example, may be a remote control unit (so-called remote controller) using an infrared ray or other radio waves or an external connection apparatusesuch as a mobile phone or a PDA corresponding to an operation of the audio signal transmitting apparatus 10.

The display interface 113 is an interface to transmit an output signal output from the CPU 101 to the display unit 115 (will be described later). The display unit 115, for example, includes a display apparatusesuch as a CRT display device, a liquid crystal display device, a plasma display device, an EL display device, or a lamp which can visually notify a user of various pieces of information.

The external apparatus communication unit 121, for example, is a communication interface including a communication apparatus or the like to communicate with the audio signal receiving apparatus 20 or various audio signal output apparatuses. The external apparatus communication unit 121 may be an interface conforming to a general wireless audio transmission rule or an interface conforming to a specific wireless audio transmission rule. As the external apparatus communication unit 121, as a matter of course, for example, may be an external output terminal (not shown) to perform data communication with the audio signal transmitting apparatus 10 by wire through a cable or the like. The audio signal transmitting apparatus 10 according to the embodiment transmits an audio signal to the audio signal receiving apparatus 20 through the external apparatus communication unit 121 and performs interactive data communication with the audio signal receiving apparatus 20.

The DSP 123 is a CPU specialized for various processes for an audio signal or an image signal. To the DSP 123, an audio signal input unit 125 to which an audio signal used in transmission is input and an audio signal output unit 137 which outputs the acquired audio signal are connected.

The audio signal input unit 125 is a processing unit to which an audio signal used in transmission by the audio signal transmitting apparatus 10 according to the embodiment is input. The audio signal input unit 125, for example, includes a CD/DVD/BD 127, a digital input 129 to which a digital device such as an MD (Mini Disk) is connected, a tuner (TUNER) 131, an analog input 133 to which an analog device such as a cassette tape recorder or a record player is connected, and the like. Audio signals input from the tuner 131 and the analog input 133 are converted from analog signals to digital signals by the AD converter 135. The audio signal input by the audio signal input unit 125 is transmitted to the audio signal receiving apparatus 20 through the DSP 123 and the external apparatus communication unit 121.

The audio signal output unit 137 is a processing unit which outputs the audio signal input from the audio signal input unit 125 to the outside of the audio signal transmitting apparatus 10. The audio signal output unit 137 includes, for example, a DA converter (not shown) which converts an audio signal serving as a digital signal into an analog signal, an amplification unit (not shown) which amplifies the audio signal converted into the analog signal, a loudspeaker (not shown) which outputs the amplified audio signal, and the like.

The audio signal transmitting apparatus 10 according to the embodiment may include, in addition to the above configuration, for example, a storage device (not shown), a drive (not shown), and the like.

The storage device is a data storage device configured as an example of a storage unit of the audio signal transmitting apparatus 10 according to the embodiment, and the storage device includes, for example, a magnetic storage unit device such as an HDD (Hard Disk Drive), a semiconductor memory device, an optical memory device, a magnetooptical storage device, and the like. The storage device can store a program executed by the CPU 101, various data, an audio signal acquired from the outside, and the like.

The drive is a reader/writer for a storage medium which is incorporated or externally attached to the audio signal transmitting apparatus 10. The drive reads information recorded on a removal recording medium such as a loaded magnetic disk, an optical disk, a magnetooptical disk, or a semiconductor memory and outputs the information to the RAM 105. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark) (CompactFlash: CF), a memory stick, an SD memory card (Secure Digital memory card), or the like. The removal recording medium, for example, may be an IC card (Integrated Circuit card) on which a noncontact IC chip is mounted, an electronic device, or the like.

With the above configuration described above, the audio signal transmitting apparatus 10 acquires audio signals from various audio signal output sources, makes it possible to transmit the audio signal to the audio signal receiving apparatus 20 through the external apparatus communication unit 121, and can perform interactive data communication with the audio signal receiving apparatus 20.

An example of the hardware configuration which can realize the function of the audio signal transmitting apparatus 10 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

(Hardware Configuration of Audio Signal Receiving Apparatus 20)

Figure 3:
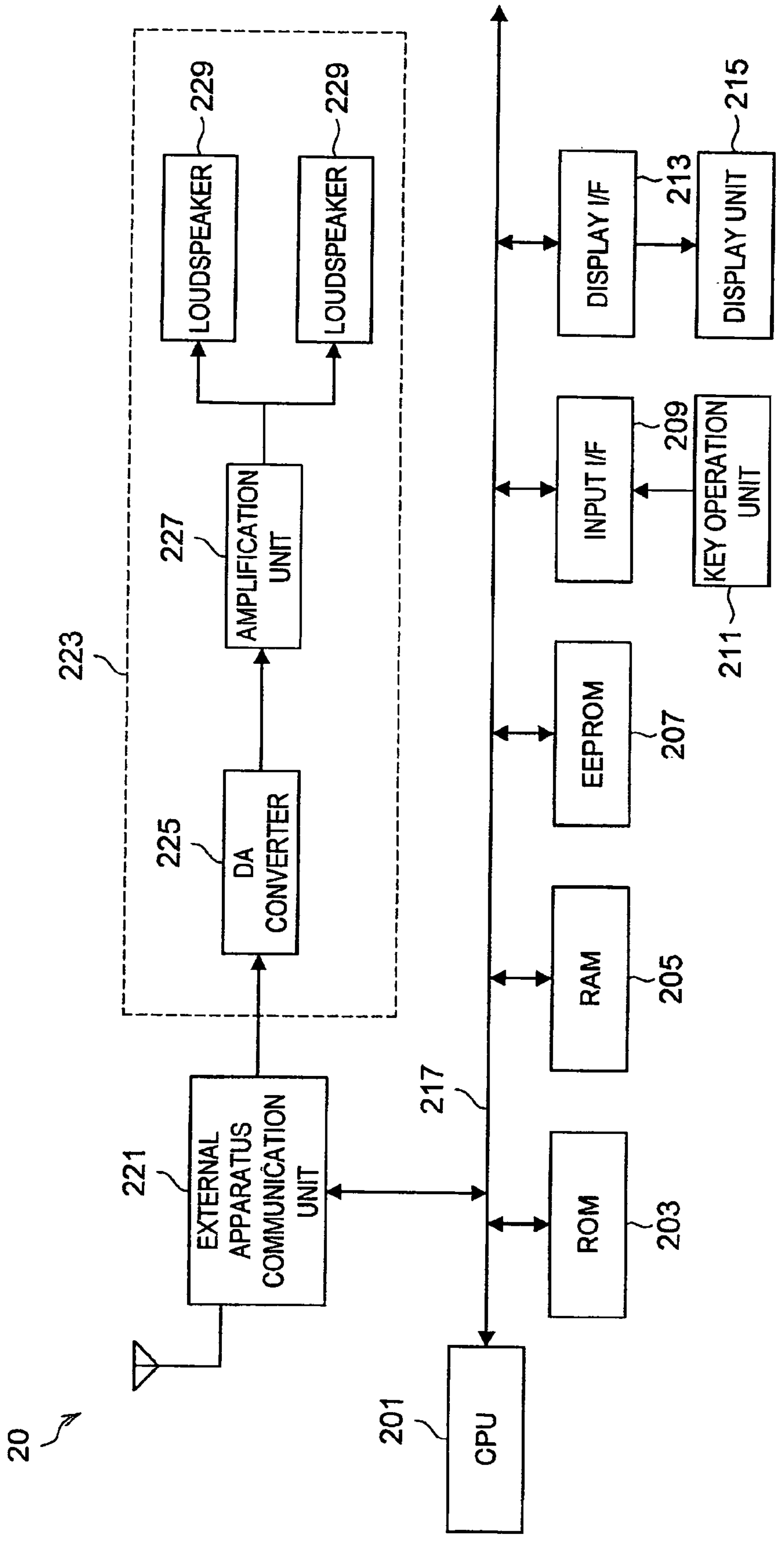
FIG. 3 is a block diagram showing a hardware configuration of an audio signal receiving apparatus according the embodiment.

Subsequently, with reference to FIG. 3, a hardware configuration of the audio signal receiving apparatus 20 according to the embodiment will be described in detail. FIG. 3 is a block diagram showing the hardware configuration of the audio signal receiving apparatus 20 according to the embodiment.

As shown in FIG. 3, the audio signal receiving apparatus 20 according to the embodiment includes a CPU 201, a ROM 203, a RAM 205, an EEPROM 207, an input interface (I/F) 209, a display interface (I/F) 213, and an external apparatus communication unit 221.

To the external apparatus communication unit 221, an audio signal output unit 223 which outputs a received audio signal is connected.

The CPU 201 functions as an arithmetic processing unit and a control unit and controls an entire operation or a part of the operation in the audio signal receiving apparatus 20 according to various programs recorded on the ROM 203, the RAM 205, the EEPROM 207, and the like. The ROM 203 and the EEPROM 207 store a program, an operation parameter, and the like used by the CPU 201. The RAM 205 temporarily stores a program used in execution of the CPU 201, a parameter properly changed in the execution, and the like. These components are connected to each other by a host bus including an internal bus such as a CPU bus and a system bus 217 including an external bus such as a PCI bus.

The input interface 209 is an interface which includes an input control circuit or the like which generates an input signal on the basis of information input by user by means of a key operation unit 211 and outputs the input signal to the CPU 201. The user of the audio signal receiving apparatus 20 can input various data or designate a processing operation to the audio signal receiving apparatus 20 by operating the key operation unit 211 described below.

The key operation unit 211 is an operation unit which inputs various data or designates a processing operation to the audio signal receiving apparatus 20. The key operation unit 211, for example, is an operation unit such as a mouse, a keyboard, a touch panel, a button, a switch, or a lever which operated by a user. The key operation unit 211, for example, may be a remote control unit (so-called remote controller) using an infrared ray or other radio waves or an external connection apparatusesuch as a mobile phone or a PDA corresponding to an operation of the audio signal receiving apparatus 20.

The display interface 213 is an interface to transmit an output signal output from the CPU 201 to a display unit 215 (will be described later). The display unit 215, for example, includes a display device such as a CRT display device, a liquid crystal display device, a plasma display device, an EL display device, or a lamp which can visually notify a user of various pieces of information.

The external apparatus communication unit 221, for example, is a communication interface including a communication apparatus or the like to communicate with the audio signal transmitting apparatus 10 or various audio signal output apparatuses. The external apparatus communication unit 221 may be an interface conforming to a general wireless audio transmission rule or an interface conforming to a specific wireless audio transmission rule. As the external apparatus communication unit 221, as a matter of course, for example, may be an external output terminal (not shown) to perform data communication with the audio signal transmitting apparatus 10 by wire through a cable or the like. The audio signal receiving apparatus 20 according to the embodiment receives an audio signal from the audio signal transmitting apparatus 10 through the external apparatus communication unit 221 and performs interactive data communication with the audio signal transmitting apparatus 10.

The audio signal output unit 223 is a processing unit which outputs an audio signal transmitted from the audio signal transmitting apparatus 10. The audio signal output unit 223, as shown in FIG. 3, includes, for example, a DA converter 225, an amplification unit 227, and a loudspeaker 229.

The DA converter 225 converts the received audio signal from a digital signal to an analog signal. The audio signal converted into the analog signal is amplified by the amplification unit 227 and output from the loudspeaker 229.

The audio signal receiving apparatus 20 according to the embodiment may include a DSP and an audio signal input unit included in the audio signal transmitting apparatus 10 according to the embodiment. Furthermore, the audio signal receiving apparatus 20 may include, in addition to the above configuration, for example, a storage device (not shown), a drive (not shown), and the like.

The storage device is a data storage device configured as an example of a storage unit of the audio signal receiving apparatus 20 according to the embodiment, and the storage device includes, for example, a magnetic storage unit device such as an HDD (Hard Disk Drive), a semiconductor memory device, an optical memory device, a magnetooptical storage device, and the like. The storage device can store a program executed by the CPU 201, various data, an audio signal acquired from the outside, and the like.

The drive is a reader/writer for a storage medium which is incorporated or externally attached to the audio signal receiving apparatus 20. The drive reads information recorded on a removal recording medium such as a loaded magnetic disk, an optical disk, a magnetooptical disk, or a semiconductor memory and outputs the information to the RAM 205. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark), a memory stick, an SD memory card, or the like. The removal recording medium, for example, may be an IC card on which a noncontact IC chip is mounted, an electronic apparatus, or the like.

With the above configuration described above, the audio signal receiving apparatus 20 can acquire audio signals from the audio signal transmitting apparatus 10 through the external apparatus communication unit 221, and can perform interactive data communication with the audio signal transmitting apparatus 10.

An example of the hardware configuration which can realize the function of the audio signal receiving apparatus 20 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

(Functional Configuration of Audio Signal Transmitting Apparatus 10)

Figure 4:
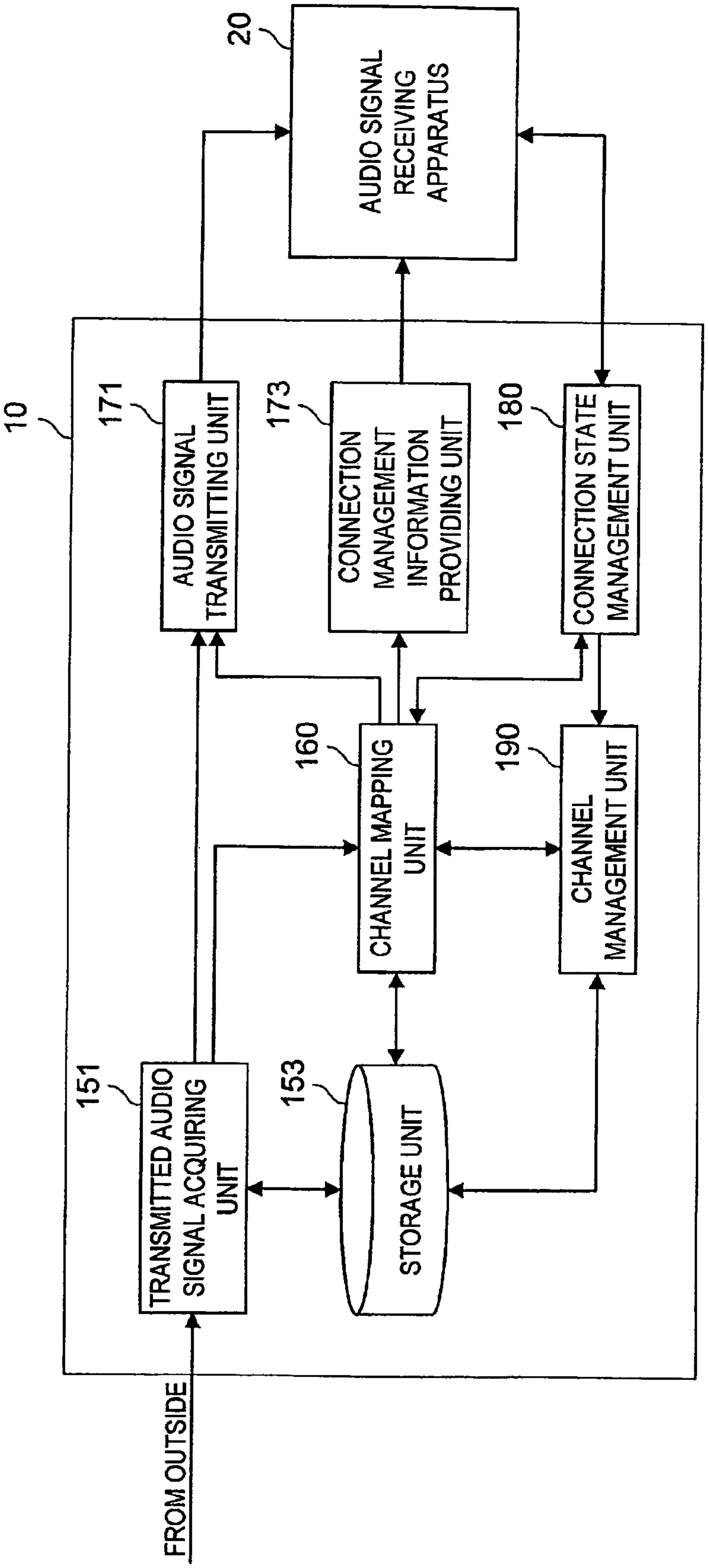
FIG. 4 is a block diagram showing a functional configuration of the audio signal transmitting apparatus according to the embodiment.

A functional configuration of the audio signal transmitting apparatus 10 according to the embodiment realized by the above hardware configuration will be described below in detail with reference to FIG. 4. FIG. 4 is a block diagram showing the functional configuration of the audio signal transmitting apparatus 10 according to the embodiment.

The audio signal transmitting apparatus 10 according to the embodiment is an apparatus which transmits audio signals to external connection apparatuses through a plurality of channels. More specifically, as shown in FIG. 4, the audio signal transmitting apparatus 10 includes a transmitted audio signal acquiring unit 151, a storage unit 153, a channel mapping unit 160, an audio signal transmitting unit 171, a connection management information providing-unit 173, a connection state management unit 180, and a channel management unit 190.

The transmitted audio signal acquiring unit 151, for example, includes a CPU, a ROM, a RAM, an EEPROM, an external apparatus communication unit, and the like, acquires an audio signal output from an audio signal output apparatus 12 such as a CD player, a DVD player, or a BD player, and obtains an audio signal to be transmitted to the audio signal receiving apparatus 20. The transmitted audio signal acquiring unit 151 can also acquire an audio signal obtained by a radio broadcast or the like through a tuner or the like. Furthermore, the transmitted audio signal acquiring unit 151 can acquire an audio signal from the storage unit 153 when an audio signal is recorded on the storage unit 153. The audio signal acquired by the transmitted audio signal acquiring unit 151 can be transmitted to the storage unit 153, the external output unit 155, the headphone output unit 157, and the audio signal transmitting unit 159 (will be described later). The audio signal acquired by the transmitted audio signal acquiring unit 151 may be stored in the storage unit 153. The information related to the contents of the audio signal acquired by the transmitted audio signal acquiring unit 151 is supplied to a channel mapping unit 160 (will be described later). In the channel mapping unit 160, on the basis of the contents or the like of the audio signal, audio signals to be allocated to each of the channels are determined.

<About Storage Unit 153>

In the storage unit 153, for example, the audio signal acquired by the transmitted audio signal acquiring unit 151, a database in which types of audio signals structuring CH mapping information (will be described later) are recorded, various pieces of transmitting information which can be transmitted to the audio signal receiving apparatus 20, various programs and processing methods used by the audio signal transmitting apparatus 10 according to the embodiment, and the like are stored.

Furthermore, the storage unit 153 can arbitrarily store, in addition to the data base and the programs, various parameters or intermediate steps of processing which need to be stored when the audio signal transmitting apparatus 10 performs any process. In the storage unit 153, the transmitted audio signal acquiring unit 151, the channel mapping unit 160, a connection state management unit 180, a channel management unit 190, and the like can freely write data.

<About Channel Mapping Unit 160>

The channel mapping unit 160 includes, for example, a CPU, a ROM, a RAM, an EEPROM, and the like and determines audio signals which are allocated to each of the channels. The channel mapping unit 160 generates channel mapping information representing types of the audio channels allocated to each of the channels.

The "channel (CH) mapping information" mentioned here is a set of pieces of information representing the types of the audio signals transmitted through the plurality of channels. As the types of the audio signals, like a type of an audio signal acquired from a DVD or a type of an audio signal or the like acquired from a apparatus connected to a digital input, a type representing a source of an audio signal, as in sub-sound or the like for a sub-woofer, a surround rear speaker or a surround back speaker, a type representing that an audio signal is for surround sound, and the like are known. The details of the channel mapping information (CH mapping information) will be described later.

Figure 5:
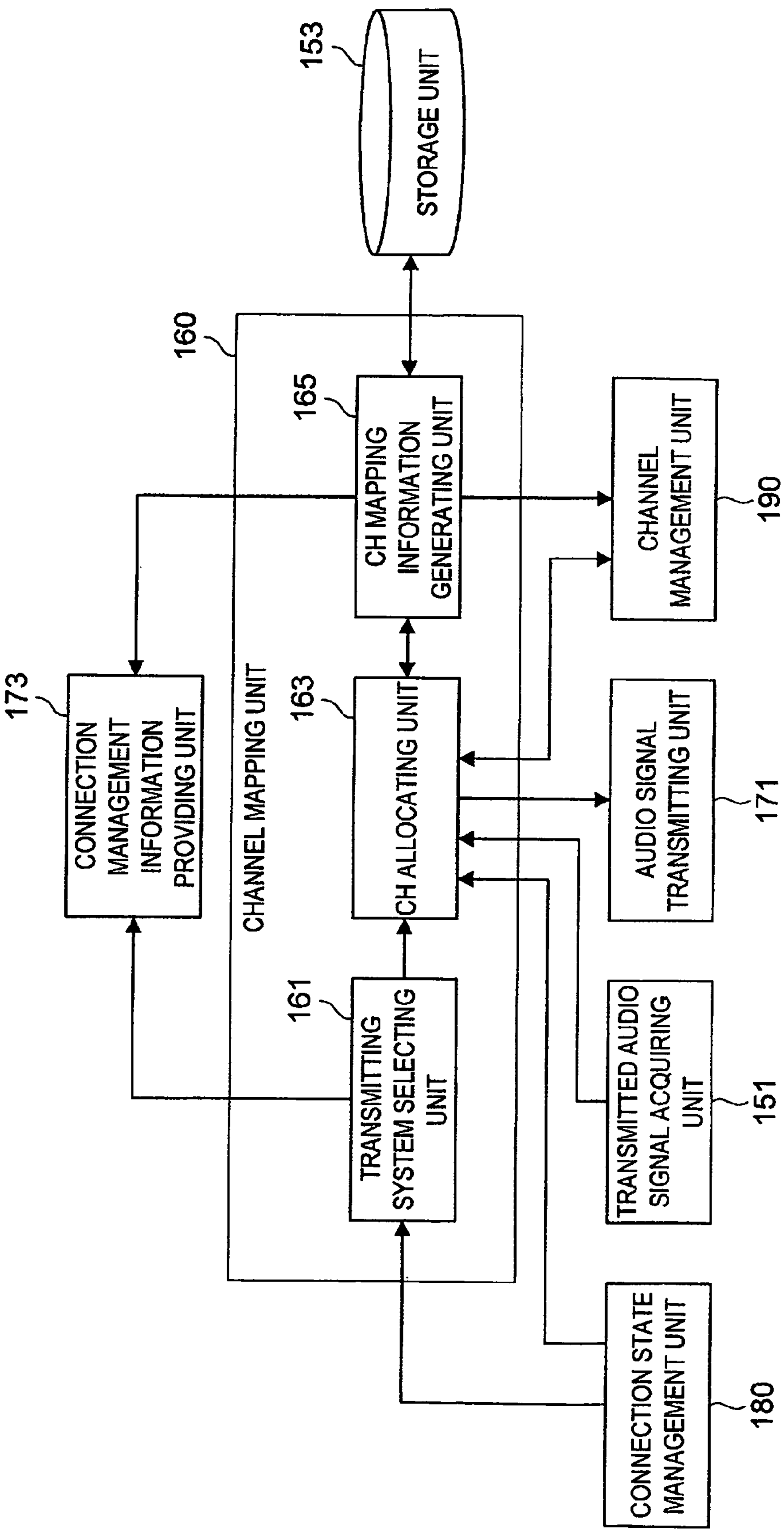
FIG. 5 is a block diagram showing a functional configuration of a channel mapping unit according to the embodiment.

In this case, a functional configuration of the channel mapping unit 160 according to the embodiment will be described below in detail with reference to FIG. 5. FIG. 5 is a block diagram showing a functional configuration of the channel mapping unit 160 according to the embodiment.

As shown in FIG. 5, the channel mapping unit 160 has a transmitting scheme selecting unit 161, a channel (CH) allocating unit 163, and a CH mapping information generating unit 165.

Before the detailed explanation of the channel mapping unit 160, types of the audio signal receiving apparatus 20 and a transmitting scheme of an audio signal by the audio signal transmitting unit 171 will be described.

An audio signal acquired by the transmitted audio signal acquiring unit 151 described above is acquired from, for example, an audio signal output apparatus 12 such as a CD player, a DVD player, or a BD player or an audio source such as radio broadcasting. The transmitted audio signal acquiring unit 151 can acquire an audio signal from one or two or more audio sources. However, the audio signal acquired from one audio source generally includes a plurality of audio signals. The plurality of audio signals include a main signal of one type and surround signals of one type or two or more types. A "main signal" in the embodiment means an audio signal necessary for reproducing contents output from a main loudspeaker mainly arranged at the front, for example, an audio signal corresponding to a main sound of, for example, a DVD. A "surround signal" in the embodiment means an audio signal corresponding to a surround component of a sound output obtained by the main signal. For example, an audio signal for sub-woofer, an audio signal for center speaker, an audio signal for surround rear speaker, an audio signal for surround back speaker, or the like is given.

Types of the audio signal receiving apparatus 20 according to the embodiment are classified into the type of a main apparatus having a function that outputs the main signal and the type of a surround apparatus having a function that outputs the surround signal. As the main apparatus, for example, an audio signal output apparatussuch as an audio component which outputs an audio signal transmitted from the audio signal transmitting apparatus 10 arranged in ROOM 2 shown in FIG. 1, an audio signal acquiring apparatussuch as headphones or an earphones, and the like are given. As the surround apparatus, for example, as shown in ROOM 1 in FIG. 1, a surround speaker group wirelessly connected to the audio signal transmitting apparatus 10 is given.

A first transmitting scheme of an audio signal according to the embodiment is a transmitting scheme in which a surround signal of any one type of surround signals of one type or two more types is allocated to at least one of the plurality of channels held by the audio signal transmitting apparatus 10 to transmit the surround signal to the audio signal receiving apparatus 20. Hereinafter, the first transmitting scheme will be also called a "transmitting scheme of surround mode". A second transmitting scheme of an audio signal according to the embodiment is a transmitting scheme in which only a main signal acquired from one or two or more audio sources is allocated to some or all of the plurality of channels held by the audio signal transmitting apparatus 10 to transmit the main signal to the audio signal receiving apparatus 20. Hereinafter, the second transmitting scheme will be also called a "transmitting scheme of multi-source mode". A configuration of the channel mapping unit 160 will be described below in detail.

The transmitting scheme selecting unit 161 selects any one of the first transmitting scheme and the second transmitting scheme depending on the type of the audio signal receiving apparatus 20 which can output an audio signal transmitted by the audio signal transmitting unit 171. More specifically, the transmitting scheme selecting unit 161 selects any one of the first transmitting scheme and the second transmitting scheme depending on a determination result of which a connection state management unit 180 (will be described later) notifies and which is obtained by determining whether a surround apparatus which can output an audio signal transmitted by the audio signal transmitting unit 171 is present. When the notice of the determination result is a notice representing that the surround apparatus is present, the transmitting scheme selecting unit 161 selects the first transmitting scheme. On the other hand, when the notice of the determination result is a notice representing that the surround apparatus is absent, the transmitting scheme selecting unit 161 selects the second transmitting scheme.

The transmitting scheme selecting unit 161 supplies transmitting scheme information representing a selected transmitting scheme to the CH allocating unit 163 and the connection management information providing unit 173.

When the first transmitting scheme is selected by the transmitting scheme selecting unit 161, the CH allocating unit 163 allocates any one of surround signals of one type or two or more types to at least one of the plurality of channels held by the audio signal transmitting apparatus 10. On the other hand, when the second transmitting scheme is selected by the transmitting scheme selecting unit 161, the CH allocating unit 163 allocates only a main signal acquired from one or two or more audio sources to some or all of the plurality of channels held by the audio signal transmitting apparatus 10. At this time, the CH allocating unit 163, on the basis of information related to the contents of the audio signal supplied from the transmitted audio signal acquiring unit 151, allocates audio signals to the channels. The CH allocating unit 163 notifies the CH mapping information generating unit 165 and the audio signal transmitting unit 171 of a result of allocation of the audio signals to the channels.

When the first transmitting scheme is selected by the transmitting scheme selecting unit 161, the CH allocating unit 163 receives connection apparatus information supplied from the connection state management unit 180. The "connection apparatus information" mentioned here is information including information related to the number and types of audio signal receiving apparatuses 20 which can output audio signals transmitted by the audio signal transmitting unit 171. The CH allocating unit 163 recognizes the number of surround apparatuses which can output the audio signal transmitted by the audio signal transmitting unit 171 and included in the supplied connection apparatus information. The CH allocating unit 163 preferentially allocates surround signals of one type or two or more types which can be output by the surround apparatuses to the channels.

More specifically, the CH allocating unit 163 allocates the surround signals of one type or two or more types to channels the number of which is equal to the number of surround apparatuses recognized as described above. The CH allocating unit 163 allocates one or two or more main signals to the remaining channels to which the surround signals are not allocated. More specifically, the connection state management unit 180 determines the types and number of audio signal receiving apparatuses connected to the audio signal transmitting apparatus 10. The CH allocating unit 163 which receives a result of the determined secures the number of channels which is equal to the number of surround apparatuses. Thereafter, the remaining channels are allocated to the main apparatuses. When the first transmitting scheme is selected, the CH allocating unit 163 performs the allocation of channels as described above, so that excessive channels can be allocated to the main apparatuses when the surround apparatuses are not connected to the audio signal transmitting apparatus 10. Therefore, according to the embodiment, allocation of channels by the CH allocating unit 163 can be dynamically changed depending on the types and number of audio signal receiving apparatuses 20, so that the channels held by the audio signal transmitting apparatus 10 can be effectively used.

When the CH allocating unit 163 allocates a new surround signal to a channel, the CH allocating unit 163 can also determine the presence/absence of a channel (to be referred to as an "idle channel" hereinafter) to which no audio signal is allocated on the basis of CH mapping information acquired from the CH mapping information generating unit 165. As a result of the determination, when the CH allocating unit 163 determines that the idle channel is present, the CH allocating unit 163 allocates a new surround signal to the idle channel.

On the other hand, when the CH allocating unit 163 determines that the idle channel is absent, the CH allocating unit 163 allocates a new surround signal to one channel of channels (to be referred to as main channels hereinafter) to which main signals are allocated.

At this time, when a plurality of channels are present, the CH allocating unit 163 can acquire information related to the number (the number of output main apparatuses) of main apparatuses which output audio signals transmitted from the main channels and information related to a main channel having the smallest number of output main apparatuses from the channel management unit 190. In this case, the CH allocating unit 163, on the basis of the information acquired from the channel management unit 190, can also allocate a new surround signal to the main channel having the smallest number of output main apparatuses.

Furthermore, at this time, when the CH allocating unit 163 determines that the idle channel is absent, the CH allocating unit 163 can also make a request to increase the number of channels held by the audio signal transmitting apparatus 10. As the process of increasing the number of channels, for example, a process of generating a 5.1 ch output signal from a 2 ch input is given. As a result of the process, when the number of channels increases, the CH allocating unit 163 can also allocate a new surround signal to the added channel.

The CH allocating unit 163 desirably allocates a main signal to at least one of the plurality of channels held by the audio signal transmitting apparatus 10. This process is performed to cause the CH allocating unit 163 to cope with a case in which a loudspeaker or headphones having a function that outputs a main signal is connected to the audio signal transmitting apparatus 10. At least one channel may be managed by the audio signal transmitting apparatus 10 depending on the number of audio signal receiving apparatuses 20 connected to the audio signal transmitting apparatus 10 or the like, or may be set by a user input in advance.

The CH mapping information generating unit 165 generates CH mapping information on the basis of a result of allocation of audio signals to channels by the CH allocating unit 163. The CH mapping information generating unit 165 forms new CH mapping information by changing the types and number of the audio signal receiving apparatuses 20 connected to the audio signal transmitting apparatus 10. In generation of the new CH mapping information, the CH mapping information generating unit 165 dynamically generate CH mapping information with reference to, for example, various databases stored in the storage unit 153, the information transmitted from the CH allocating unit 163, and the like. The generated new CH mapping information is supplied to connection management information providing unit 173 (will be described later) and the channel management unit 190. The generated new CH mapping information may also be recorded on the storage unit 153.

(About Channel Mapping Information)

With reference to FIGS. 6A and 6B, channel mapping information generated by the audio signal transmitting apparatus 10 according to the embodiment will be described below in detail. FIGS. 6A and 6B are explanatory diagrams for explaining an example of the channel mapping information according to the embodiment.

The CH mapping information generated by the audio signal transmitting apparatus 10 according to the embodiment is regulated as a set of pieces of information representing types of audio signals allocated to a plurality of channels (CHs) which can transmit at least two stereo signals (in other words, at least 4-channel monaural signals), respectively.

FIGS. 6A and 6B show an example of CH mapping information allocated to each of the channels which can transmit four stereo signals (in other words, 8-channel monaural signals). In FIGS. 6A and 6B, as is apparent from these drawings, a frame which can cope with two monaural signals is arranged for one channel, and the types of a total of 8 audio signals are regulated.

In the audio signal transmitting apparatus 10 according to the embodiment, pieces of CH mapping information of two types, i.e., CH mapping information as shown in FIG. 6A and CH mapping information as shown in FIG. 6B can be generated.

In the CH mapping information shown in FIG. 6A, one pair of main channels are set to channel 1, and sub-channels corresponding to the main channels are set to channel 2 to channel 4. The main channel mentioned here is a channel to which a main signal which can be output by the main apparatus is allocated, and means a channel which outputs a source of an audio signal corresponding to a main sound of, for example, a DVD. On the other hand, the sub-channel is a channel to which a surround signal which can be output by the surround apparatus is allocated, and means a channel which outputs an audio signal attached to the main channel, such as, for example, a DVD surround sound.

To the sub-channels shown in FIG. 6A, for example, various sub-channels of signals such as an audio signal for subwoofer, an audio signal for center speaker, an audio signal for surround rear speaker, an audio signal for surround back speaker, and the like can be allocated. For example, a case in which as the audio signal receiving apparatus 20, a center speaker, a surround rear speaker, and a surround back speaker are connected to the audio signal transmitting apparatus 10, and sub-channels of the audio signal for center speaker, the audio signal for surround speaker, and an audio signal for surround back speaker, corresponding to the same contents as that of main contents, are allocated will be considered. In this case, the audio signal transmitting apparatus 10 outputs the audio signal of the main channel, and the audio signal receiving apparatus 20, i.e., the center speaker, the surround rear speaker, and the surround back speaker output audio signals of the corresponding sub-channels.

As shown in FIG. 6A, the CH mapping information including the channel to which the main channel is allocated and the channel to which the sub-channel is allocated is called CH mapping information of a "surround mode" hereinafter. The "CH mapping information of surround mode" is CH mapping information corresponding to the "transmitting scheme of surround mode". In the CH mapping information shown in FIG. 5A, only one channel to which a main channel is allocated is present. However, two or more channels to which main channels are allocated may be present.

On the other hand, in CH mapping information shown in FIG. 6B, main channels are allocated to four channels, respectively, and a channel to which the sub-channel is allocated is not present. This corresponds to a case in which a CD sound source, a DVD sound source, a tuner sound source, and a digital input source are allocated to channel 1, channel 2, channel 3, and channel 4, respectively.

As shown in FIG. 6B, the CH mapping information in which main channels are allocated to the plurality of channels, respectively is called CH mapping information of a "multi-source mode" hereinafter. The "CH mapping information of surround mode" is CH mapping information corresponding to the "transmitting scheme of multi-source mode". The CH mapping information of multi-source mode, as shown in FIG. 5B, does not include a channel to which a surround component is allocated.

The audio signal transmitting apparatus 10 can generate any one of the pieces of CH mapping information in a surround mode and a multi-source mode (in other words, whether any one of the transmitting scheme of surround mode and the transmitting scheme of multi-source mode can be used) depending on the audio signal transmitting apparatus 10. Therefore, the audio signal transmitting apparatus 10 dedicated to the surround mode does need to be present, and the audio signal transmitting apparatus 10 dedicated to the multi-source mode may be present. The audio signal transmitting apparatus 10 capable of coping with both modes may be present.

When any channel of the CH mapping information is matched with an identification type allocated to the audio signal receiving apparatus, the audio signal receiving apparatus 20 according to the embodiment can output an audio signal allocated to the matched channel.

More specifically, when the identification type allocated to the audio signal receiving apparatus 20 is a "surround rear speaker", the audio signal receiving apparatus 20 can output an audio signal having a type "surround rear speaker" described in the CH mapping information.

<About Audio Signal Transmitting Unit 171>

The audio signal transmitting unit 171 includes, for example, a CPU, a ROM, a RAM, an EEPROM, a DSU, an external apparatus communication unit, and the like, distributes audio signals supplied from the transmitted audio signal acquiring unit 151 to channels, respectively, on the basis of a CH mapping result (or CH mapping information) transmitted from the channel mapping unit 160, and transmits the audio signal to the audio signal receiving apparatus 20. The transmission of the audio signals by the audio signal transmitting unit 171 is performed by the first transmitting scheme or the second transmitting scheme. When an audio signal to be transmitted needs to be converted to cope with types of the audio signals (attributes of audio signals) in the channels described in the CH mapping information, the audio signal transmitting unit 171 performs a predetermined conversion process to the audio signal to be transmitted and transmits the converted audio signal. In this case, as the conversion process described above, for example, when an unconverted audio signal is an audio signal corresponding to a 5.1 channel system, the audio signal may be down-mixed to a normal 2-channel audio signal.

<About Connection Management Information Providing Unit 173>

The connection management information providing unit 173 includes, for example, a CPU, a ROM, a RAM, an EEPROM, an external apparatus communication unit, and the like, and provides connection management information including transmitting scheme information representing the transmitting scheme selected by the transmitting scheme selecting unit 161 and information, such as the CH mapping information generated by the CH mapping information generating unit 165, including information representing a connection state to the audio signal transmitting apparatus 10 to an external connection apparatusesuch as the audio signal receiving apparatus 20.

The connection management information may be provided to all the external connection apparatuses regardless of whether a connection is established, or may be performed to only an external connection apparatus which notifies of a request to provide the connection management information. With respective to the providing of the CH mapping information, the connection management information providing unit 173 may voluntarily transmit the CH mapping information generated by the CH mapping information generating unit 165 when the CH mapping information is transmitted by the CH mapping information generating unit 165. When data communication with an external connection apparatus occurs, new CH mapping information may be simultaneously transmitted.

<About Connection State Management Unit 180>

Figure 7:
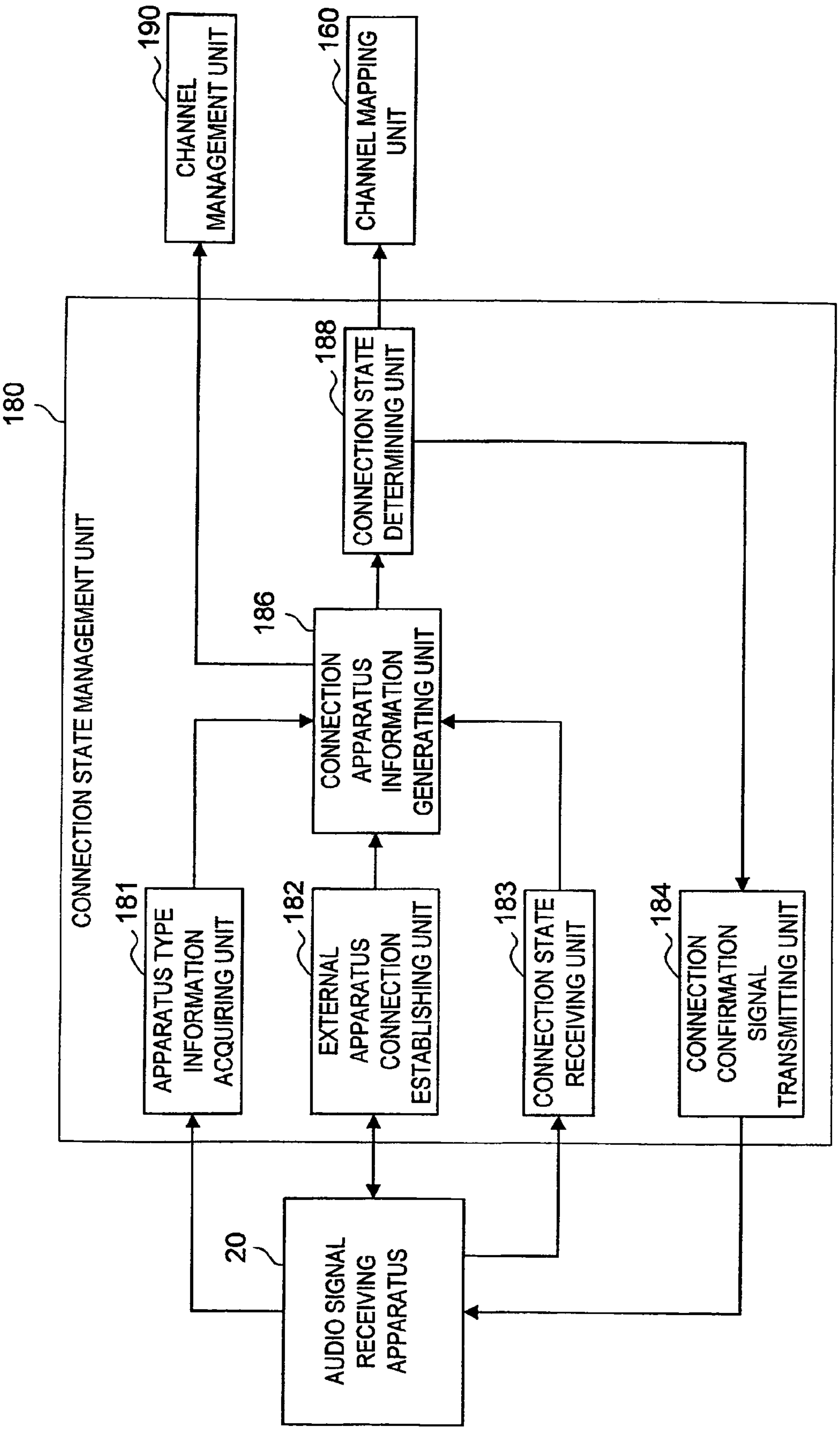
FIG. 7 is a block diagram showing a functional configuration of a connection state managing unit according to the embodiment.

The connection state management unit 180 includes, for example, a CPU, a ROM, a RAM, an EEPROM, and the like, and manages a connection state of an external connection apparatus which can be connected to the audio signal transmitting apparatus 10. A concrete functional configuration of the connection state management unit 180 will be described below with reference to FIG. 7. FIG. 7 is a block diagram showing the functional configuration of the connection state management unit 180 according to the embodiment.

As shown in FIG. 7, the connection state management unit 180 has a apparatus type information acquiring unit 181, an external apparatus connection establishing unit 182, a connection state receiving unit 183, a connection confirmation signal transmitting signal 184, a connection apparatus information generating unit 186, and a connection state determining unit 188.

The apparatus type information acquiring unit 181 acquires apparatus type information representing that the type of the audio signal receiving apparatus 20 is a main apparatus or a surround apparatus from the audio signal receiving apparatus 20. The apparatus type information acquiring unit 181 supplies the acquired apparatus type information to the connection apparatus information generating unit 186 (will be described later).

The external apparatus connection establishing unit 182 establishes or cancels a connection to the audio signal receiving apparatus 20 serving as an external connection apparatus. When the external apparatus connection establishing unit 182 receives a connection establishment request transmitted from the audio signal receiving apparatus 20, the external apparatus connection establishing unit 182 determines permission/nonpermission of the connection. As a result of the determination, when the connection is permitted to be established, a connection permission notice is transmitted to the audio signal receiving apparatus 20 which transmits the connection establishment request to establish the connection to the audio signal receiving apparatus 20. When the external apparatus connection establishing unit 182 receives a connection cancellation request transmitted from the audio signal receiving apparatus 20, the external apparatus connection establishing unit 182 cancels the connection to the audio signal receiving apparatus 20. The external apparatus connection establishing unit 182 notifies the connection apparatus information generating unit 186 that the connection to the audio signal receiving apparatus 20 is established or canceled.

The connection state receiving unit 183 receives a connection state notification signal representing whether the audio signal receiving apparatus 20 is connected to the audio signal transmitting apparatus 10 from the audio signal receiving apparatus 20 at a predetermined timing. As the predetermined timing, for example, a timing when a power supply of the audio signal receiving apparatus 20 is turned on or off is given. When the power supply of the audio signal receiving apparatus 20 is turned on, the connection state receiving unit 183 receives a connection state notification signal representing the connection between the audio signal receiving apparatus 20 and the audio signal transmitting apparatus 10 is established. On the other hand, when the power supply of the audio signal receiving apparatus 20 is turned off, the connection state receiving unit 183 receives a connection state notification signal representing that the connection between the audio signal receiving apparatus 20 and the audio signal transmitting apparatus 10 is canceled. The connection state receiving unit 183 transmits the received connection state notification signal to the connection apparatus information generating unit 186.

The connection confirmation signal transmitting signal 184 transmits a connection confirmation signal which confirms whether the external connection apparatuses are connected to the audio signal transmitting apparatus 10 to the external connection apparatuses such as all the audio signal receiving apparatuses 20 connected to the audio signal transmitting apparatus 10. As a result, the connection state receiving unit 183 receives, from an external connection apparatus which responds to the connection confirmation signal, the connection state notification signal representing that the external connection apparatus is connected to the audio signal transmitting apparatus 10. The connection state receiving unit 183 determines that the audio signal receiving apparatus 20 which transmits the connection state notification signal representing that the external connection apparatus is connected to the audio signal transmitting apparatus 10 is in an operation state, and transmits the result to the connection apparatus information generating unit 186. The connection state receiving unit 183 confirms a specific channel, of the plurality of channels which transmit audio signals, to which an audio signal received by the audio signal receiving apparatus 20 being in the operation state is assigned, and transmits a result of the confirmation to the connection apparatus information generating unit 186. The connection apparatus information generating unit 186 may periodically (for example, every minute or every second) perform transmission of the connection confirmation signal.

The connection apparatus information generating unit 186 generates connection apparatus information on the basis of the apparatus type information supplied from the apparatus type information acquiring unit 181 and various pieces of information supplied from the external apparatus connection establishing unit 182 and the connection state receiving unit 183. The connection apparatus information according to the embodiment is information including the types and number of the audio signal receiving apparatuses 20 which can output audio signals transmitted by the audio signal transmitting unit 171 and the channels which output the audio signals. The connection apparatus information generating unit 186 supplies the generated connection apparatus information to the connection state determining unit 188 and the channel management unit 190 (will be described later).

The connection state determining unit 188 performs various determinations in accordance with management of connection states of the external connection apparatuses which can be connected to the audio signal transmitting apparatus 10 on the basis of the connection apparatus information supplied from the connection apparatus information generating unit 186. More specifically, the connection state determining unit 188, on the basis of the connection apparatus information supplied from the connection apparatus information generating unit 186, recognize the number of external connection apparatuses which can be connected to the audio signal transmitting apparatus 10 and the operation states of the external connection apparatuses to perform various determinations to perform connection management. As a result, when the number of external connection apparatuses connected to the audio signal transmitting apparatus 10 are updated, or when the operation states of the external connection apparatuses connected to the audio signal transmitting apparatus 10 are changed, the connection state determining unit 188 determines that allocation (i.e., CH mapping information) of channels used at the present needs to be changed. The connection state determining unit 188 requests the channel mapping unit 160 to change the allocation of the channels (consequently, generate new CH mapping information.

The connection state determining unit 188 can also determine whether a surround apparatus which can output an audio signal transmitted by the audio signal transmitting unit 171 is present on the basis of the connection apparatus information to cause the transmitting scheme selecting unit 161 to select a transmitting scheme.

Furthermore, when the transmitting scheme selecting unit 161 selects the first transmitting scheme (surround mode), the connection state determining unit 188 can supply the connection apparatus information supplied from the connection apparatus information generating unit 186 to (the CH allocating unit 163 of) the channel mapping unit 160.

When the connection state receiving unit 183 receives, from the audio signal receiving apparatus 20, a connection state notification signal representing that the receiving apparatus, the connection state determining unit 188 determines whether surround apparatuses which can output the audio signals transmitted by the audio signal transmitting unit 171 include a channel-unallocated apparatus in which an audio signal which can be output is not allocated to any one of the plurality of channels. As a result of the determination, when the connection state determining unit 188 determines that the channel-unallocated apparatus is present, the connection state determining unit 188 notifies (the CH allocating unit 163 of) the channel mapping unit 160 of the determination result. The CH allocating unit 163 which receives the notice preferentially allocates a surround signal which can be output by the channel-unallocated apparatus of which is notified by the connection state determining unit 188 to any one of the channels.

As described above, the connection state management unit 160 according to the embodiment is a management unit which entirely manages the presence/absence and operation states of various external connection apparatuses which can be connected to the audio signal transmitting apparatus 10.

<About Channel Management Unit 190>

Figure 8:
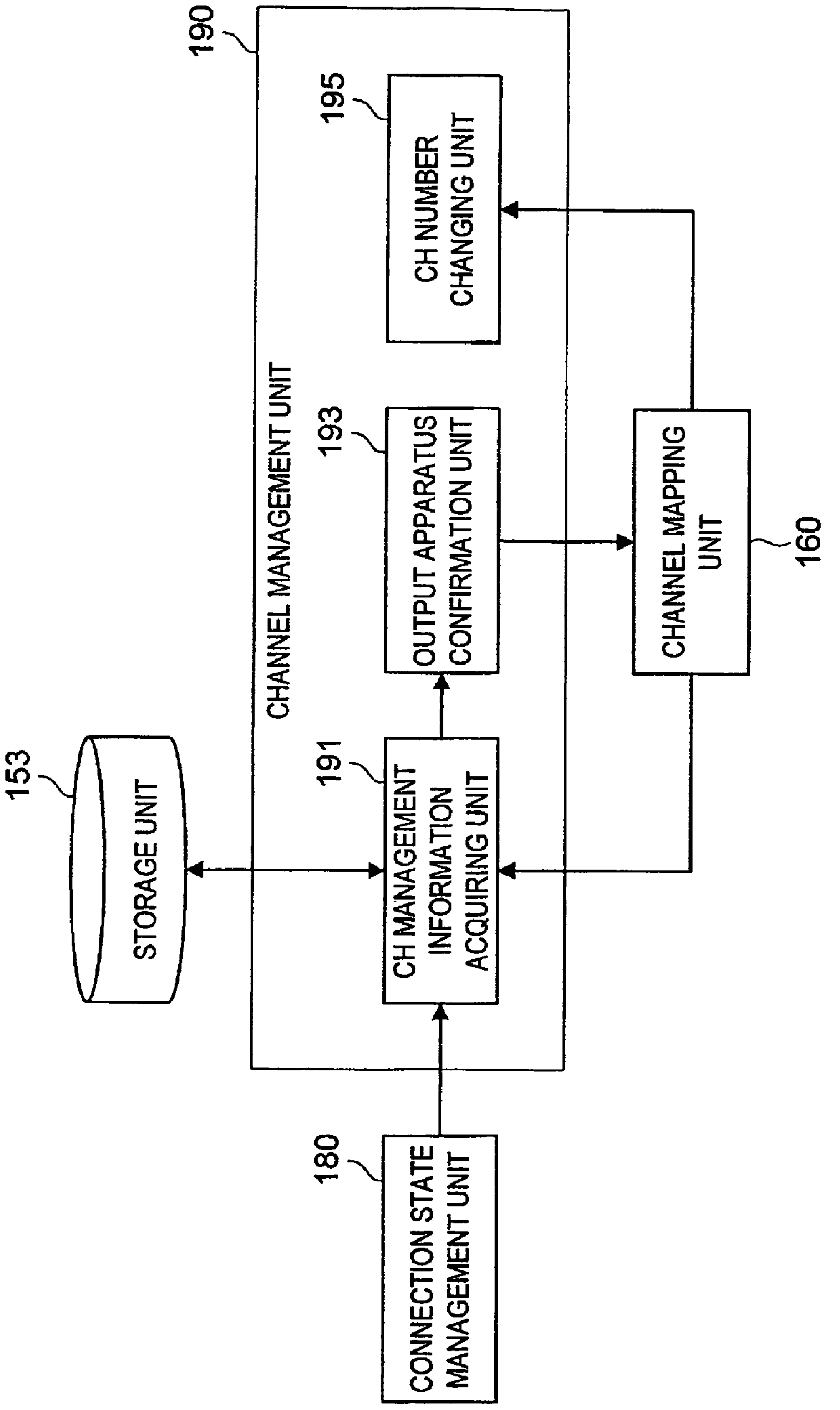
FIG. 8 is a block diagram showing a functional configuration of a channel managing unit according to the embodiment.

The channel management unit 190 includes, for example, a CPU, a ROM, a RAM, an EEPROM, and the like, and manages the numbers or the like of connected audio signal receiving apparatuses 20 with respect to the plurality of channels used in transmission of the audio signals by the audio signal transmitting apparatus 10 on the basis of the CH mapping information supplied from the channel mapping unit 160, the connection apparatus information supplied from the connection state management unit 180 and the various pieces of information stored in the storage unit 153. A concrete functional configuration of the channel management unit 190 will be described below with reference to FIG. 8. FIG. 8 is a block diagram showing the functional configuration of the channel management unit 190 according to the embodiment.

As shown in FIG. 8, the channel management unit 190 has a channel (CH) management information acquiring unit 191, an output apparatus confirmation unit 193, and a channel (CH) number changing unit 195.

The CH management information acquiring unit 191 acquires CH management information from the channel mapping unit 160, the connection state management unit 180, the storage unit 153, or the like. The Ch management information mentioned here is information necessary for management of the numbers of connected audio signal receiving apparatuses 20 with respect to the plurality of channels. For example, CH mapping information, connection apparatus information, and the like are given the CH management information acquiring unit 191 supplies the acquired CH management information to the output apparatus confirmation unit 193.

When main signals are allocated to a plurality of main channels, the output apparatus confirmation unit 193 confirms the number of main apparatuses (the number of output main apparatuses) which output audio signals transmitted from the main channels on the basis of the connection apparatus information acquired from the CH management information acquiring unit 191. The output apparatus confirmation unit 193 detects a channel having the smallest number of output main apparatuses on the basis of the confirmed number of output main apparatuses. The output apparatus confirmation unit 193 notifies (the CH allocating unit 163 of) the channel mapping unit 160.

The CH number changing unit 195 includes, for example, the DSP 123 or the like, and changes the number of channels used by the audio signal transmitting apparatus 10 depending on a request from (the CH allocating unit 163 of) the channel mapping unit 160. The request from the CH allocating unit 163 is performed when an idle channel is absent in allocation of a new surround signal by the CH allocating unit 163. The CH number changing unit 195 increases the number of channels used by the audio signal transmitting apparatus 10 depending on the request. In this manner, the CH allocating unit 163 can allocate the new surround signal to the added channel without adversely affecting the operation of the main apparatus which outputs the audio signal transmitted from the main channel.

In the audio signal transmitting apparatus 10 according to the embodiment, the transmitting of an audio signal to an external connection apparatus or the interactive communication with the external connection apparatus may be performed by wireless transmission, a PLC, or wired transmission. However, the transmitting and the communication are preferably performed by wireless transmission.

An example of the functions of the audio signal transmitting apparatus 10 according to the present invention has been described above. The constituent elements may be configured by using general-purpose members or circuits, or may include hardware specialized for the functions of the constituent elements. The functions of each constituent element may be performed by CPU and the like. Therefore, depending on a technological level obtained each time the embodiment is executed, configurations to be used can be arbitrarily changed.

(Functional Configuration of Audio Signal Receiving Apparatus 20)

Figure 9:
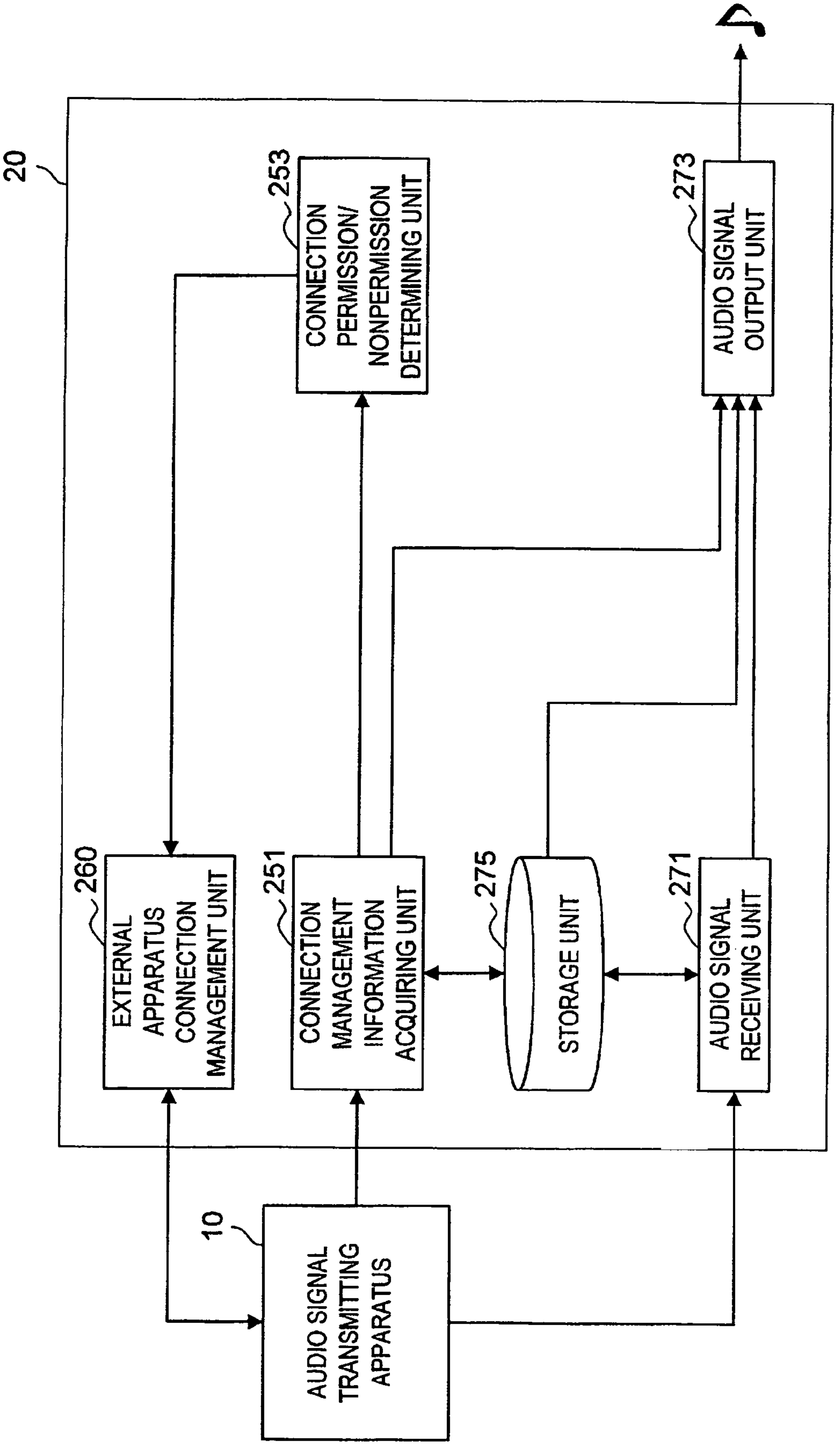
FIG. 9 is a block diagram for explaining a configuration of the audio signal receiving apparatus according to the embodiment.

A functional configuration of the audio signal receiving apparatus 20 according to the embodiment realized by the above hardware configuration described above will be described below in detail with reference to FIG. 9. FIG. 9 is a block diagram showing the functional configuration of the audio signal receiving apparatus 20 according to the embodiment.

The audio signal receiving apparatus 20 according to the embodiment is an apparatus which receives audio signals transmitted from external connection apparatuses through a plurality of channels. More specifically, as shown in FIG. 9, the audio signal receiving apparatus 20 includes a connection management information acquiring unit 251, a connection permission/nonpermission determining unit 253, an external apparatus connection management unit 260, an audio signal receiving unit 271, an audio signal output unit 273, and a storage unit 275.

<About Connection Management Information Acquiring Unit 251>

The connection management information acquiring unit 251 includes, for example, a CPU, a ROM, a RAM, an EEPROM, an external apparatus communication unit, and the like, and acquires connection management information such as transmitting scheme information related to a transmitting scheme used by the audio signal transmitting apparatus 10 and CH mapping information transmitted from the audio signal transmitting apparatus 10. The acquired connection management information is supplied to the connection permission/nonpermission determining unit 253 and the audio signal output unit 273. The connection management information acquiring unit 251 may record the acquired connection management information on the storage unit 275.

<About Connection Permission/Nonpermission Determining Unit 253>

The connection permission/nonpermission determining unit 253 determines, on the basis of the transmitting scheme information supplied from the connection management information acquiring unit 251, whether the transmitting scheme is a scheme in which the audio signal receiving apparatus 20 can be connected to the audio signal transmitting apparatus 10. More specifically, when the type of the audio signal receiving apparatus 20 is a main apparatus, the connection permission/nonpermission determining unit 253 determines whether a channel (main channel) for main apparatus is present in the channels used by the audio signal transmitting apparatus 10. As a result, when the main channel is present, the connection permission/nonpermission determining unit 253 determines that the connection is possible regardless of the transmitting scheme of the audio signal transmitting apparatus 10. On the other hand, when it is determined that the main channel is absent, the connection permission/nonpermission determining unit 253 determines that the connection can be difficult regardless of the transmitting scheme of the audio signal transmitting apparatus 10. When the type of the audio signal receiving apparatus 20 is a surround apparatus, the connection permission/nonpermission determining unit 253 determines that the connection is possible when the transmitting scheme of the audio signal transmitting apparatus 10 is the first transmitting scheme (transmitting scheme of surround mode). When the transmitting scheme of the audio signal transmitting apparatus 10 is the second transmitting scheme (transmitting scheme of multi-source mode), the connection permission/nonpermission determining unit 253 determines that the connection can be difficult. As a result of the determination, when it is determined that the audio signal receiving apparatus 20 can be connected to the audio signal transmitting apparatus 10, the connection permission/nonpermission determining unit 253 requests the external apparatus connection management unit 260 to request the audio signal transmitting apparatus 10 to make a connection request.

<About External Apparatus Connection Management Unit 260>

Figure 10:
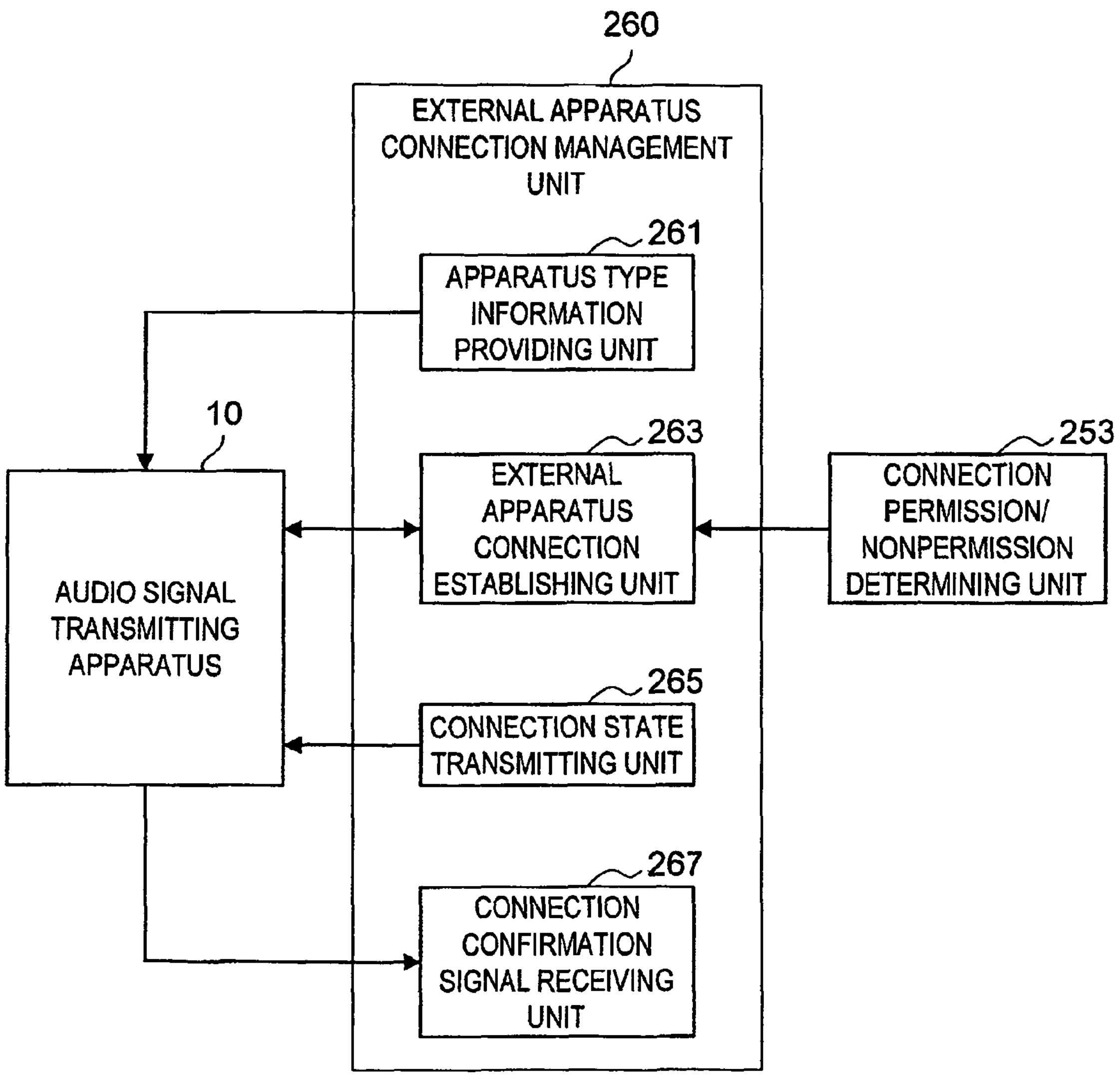
FIG. 10 is a block diagram showing a functional configuration of an external apparatus connection managing unit according to the embodiment.

The external apparatus connection management unit 260 includes, for example, a CPU, a ROM, a RAM, an EEPROM, an external apparatus communication unit, and the like, and manages whole connection between the audio signal receiving apparatus 20 and the audio signal transmitting apparatus 10. A concrete functional configuration of the external apparatus connection management unit 260 will be described below with reference to FIG. 10. FIG. 10 is a block diagram showing a functional configuration of the external apparatus connection management unit 260 according to the embodiment.

As shown in FIG. 10, the external apparatus connection management unit 260 includes a apparatus type information providing unit 261, an external apparatus connection establishing unit 263, a connection state transmitting unit 265, and a connection confirmation signal receiving unit 267.

The apparatus type information providing unit 261 provides apparatus type information representing whether the audio signal receiving apparatus 20 is a main apparatus which can output a main signal or a surround apparatus which can output a surround signal to the audio signal transmitting apparatus 10. Although not shown, the apparatus type information providing unit 261 can also read apparatus type information stored in the storage unit 275 and provide the apparatus type information to the audio signal transmitting apparatus 10.

The external apparatus connection establishing unit 263 establishes or cancels a connection to the audio signal transmitting apparatus 10 serving as an external connection apparatus. When the external apparatus connection establishing unit 263 receives a determination result representing that a connection to the audio signal transmitting apparatus 10 is possible from the connection permission/nonpermission determining unit 253, the external apparatus connection establishing unit 263 transmits a connection establishment request. When the audio signal transmitting apparatus 10 which receives the connection establishment request determines that the connection may be established, the external apparatus connection establishing unit 263 receives a connection permission notice from the audio signal transmitting apparatus 10 to establish the connection to the audio signal transmitting apparatus 10. In a predetermined case, for example, when the power supply is turned off, the external apparatus connection establishing unit 263 transmits the connection cancellation request to the audio signal transmitting apparatus 10. When the connection cancellation request is received by the audio signal transmitting apparatus 10, the connection to the audio signal transmitting apparatus 10 is canceled.

The connection state transmitting unit 265 transmits a connection state notification signal representing that the audio signal receiving apparatus 20 is connected to the audio signal transmitting apparatus 10 to the audio signal transmitting apparatus 10 at a predetermined timing. As the predetermined timing, for example, a timing when a power supply of the audio signal receiving apparatus 20 is turned on or off is given. The connection state transmitting unit 265 transmits a connection state notification signal representing that the audio signal receiving apparatus 20 is connected to the audio signal transmitting apparatus 10 when the power supply of the audio signal receiving apparatus 20 is turned on. On the other hand, the connection state transmitting unit 265 transmits a connection state notification signal representing that the connection between the audio signal receiving apparatus 20 and the audio signal transmitting apparatus 10 is canceled when the power supply of the audio signal receiving apparatus 20 is turned off.

Further, when the connection state transmitting unit 265 transmits the connection state notification signal to the audio signal transmitting apparatus 10, the connection state transmitting unit 265 may transmit the signals with the identifiers specifying the audio signal receiving apparatus 20.

The connection confirmation signal receiving unit 267 receives a connection confirmation signal which confirms whether the audio signal receiving apparatus 20 is connected to the audio signal transmitting apparatus 10 from the audio signal transmitting apparatus 10. As a result, the connection state transmitting unit 265 transmits, as a response to the connection confirmation signal, a connection state notification signal representing that the audio signal receiving apparatus 20 is connected to the audio signal transmitting apparatus 10.

<About Audio Signal Receiving Unit 271>

The audio signal receiving unit 271 includes, for example, a CPU, a ROM, a RAM, an EEPROM, an external apparatus communication unit, and the like, and receives an audio signal transmitted from the audio signal transmitting apparatus 10. The audio signal is received when it is determined by the connection permission/nonpermission determining unit 253 that a connection to the audio signal transmitting apparatus 10 is possible and when the external apparatus connection management unit 260 makes it possible to perform communication with the audio signal transmitting apparatus 10. The audio signal receiving unit 271 transmits the received audio signal to the audio signal output unit 273. The audio signal receiving unit 271 may record the received audio signal on the storage unit 275.

<About Audio Signal Output Unit 273>

The audio signal output unit 273 includes, for example, a CPU, a ROM, a RAM, an EEPROM, a loudspeaker and the like, and selects an audio signal which can be output from audio signals transmitted from the audio signal receiving unit 271 and including a plurality of channels and outputs the audio signal. The section of the audio signal which can be output is performed on the basis of the CH mapping information acquired by the connection management information acquiring unit 251. The audio signal output unit 273 may use identification information of the audio signal receiving apparatus 20 itself stored in the storage unit 275 or the like in the selection of the audio signal.

<About Storage Unit 275>

In the storage unit 275, for example, a database on which a type or the like of an audio signal configuring CH mapping information is recorded, various pieces of information which can be transmitted to the audio signal transmitting apparatus 10, various programs and processing methods used by the audio signal receiving apparatus 20 according to the embodiment are stored.

Furthermore, the storage unit 275 can appropriately store various parameters, intermediate steps of processing which need to be stored, in addition to the database and the programs, when the audio signal receiving apparatus 20 performs any process. In the storage unit 275, processing units such as the connection management information acquiring unit 251, the connection permission/nonpermission determining unit 253, the external apparatus connection management unit 260, the audio signal receiving unit 271, and the audio signal output unit 273 configuring the audio signal receiving apparatus 20 can freely write data.

In the audio signal receiving apparatus 20 according to the embodiment, reception of an audio signal transmitted from the audio signal transmitting apparatus 10 and interactive communication with the audio signal transmitting apparatus 10 may be performed by wireless transmission, PLC or wired transmission. However, the reception and the communication are preferably performed by wireless transmission.

An example of the function of the audio signal receiving apparatus 20 according to the embodiment has been described above. The constituent elements may be configured by using general-purpose members or may include hardware specialized for the functions of the constituent elements. All the functions of the constituent elements may be performed by a CPU or the like. Therefore, depending on a technological level obtained each time the embodiment is executed, configurations to be used can be arbitrarily changed.

(Connecting Process of Audio Signal Receiving Apparatus)

Figure 11:
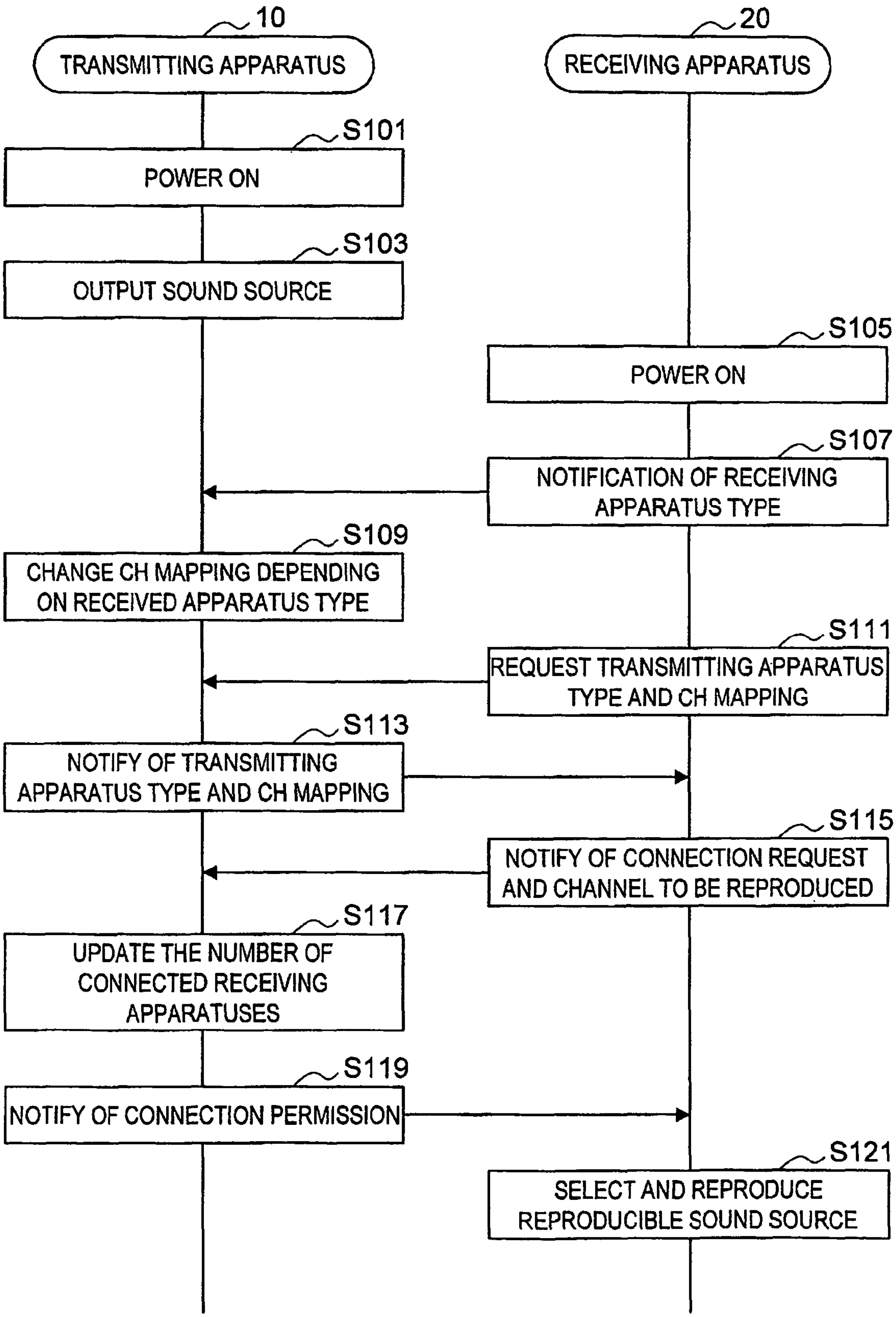
FIG. 11 is a flow chart showing a flow of connection processes of the audio signal receiving apparatus according to the embodiment.

Subsequently, with reference to FIG. 11, a connecting process of the audio signal receiving apparatus 20 to the audio signal transmitting apparatus 10 will be described below in detail. FIG. 11 is a flow chart showing a flow of the connecting process of the audio signal receiving apparatus according to the embodiment.

When the power supply of the audio signal transmitting apparatus 10 is turned on by a user (step S101), the audio signal transmitting apparatus 10 starts an output of a sound source through the audio signal output unit arranged in the audio signal transmitting apparatus 10 (step S103).

At a certain point of time, the power supply of the audio signal receiving apparatus 20 is turned on by the user (step S105), the audio signal receiving apparatus 20 notifies the audio signal transmitting apparatus 10 of a receiving apparatus type (i.e., whether the audio signal receiving apparatus 20 is a main apparatus or a surround apparatusesuch as a surround amplifier or a surround speaker) through the apparatus type information providing unit 251 with reference to the storage unit 275 or the like (step S107).

In the audio signal transmitting apparatus 10, the apparatus type information acquiring unit 181 of the connection state management unit 180 receives a receiving apparatus type notice from the audio signal receiving apparatus 20. The connection state management unit 180 determines whether the audio signal receiving apparatus 20 can be connected to the audio signal transmitting apparatus 10, and CH mapping is changed depending on a receiving apparatusesystem in the CH mapping unit 160 (step S109).

The audio signal receiving apparatus 20 notifies the audio signal transmitting apparatus 10 of a type of the audio signal transmitting apparatus 10 (i.e., representing whether the audio signal transmitting apparatus 10 employs the first transmitting scheme (surround mode) or the second transmitting scheme (multi-source mode)) and an acquiring request of CH mapping information formed on the basis of CH mapping allocated by the audio signal transmitting apparatus 10 at the present (step S111).

When the connection state management unit 180 of the audio signal transmitting apparatus 10 receives the acquiring request, the connection state management unit 180 notifies the channel mapping unit 160 of the acquiring request, and the channel mapping unit 160 transmits the type of the audio signal transmitting apparatus 10 and the CH mapping information to the audio signal receiving apparatus 20 through the connection management information providing unit 173 (step S113).

The audio signal receiving apparatus 20 which receives the type of the transmitting apparatus 10 and the CH mapping information notifies the audio signal transmitting apparatus 10 of a connection establishment request to the audio signal transmitting apparatus 10 and a channel to be desirably reproduced (step S115).

In the audio signal transmitting apparatus 10 which receives the connection establishment request from the audio signal receiving apparatus 20, the number of audio signal receiving apparatuses 20 the connections of which are established in the connection state management unit 180 updates (step S117). The audio signal transmitting apparatus 10 notifies the audio signal receiving apparatus 20 of the effect (connection establishment notice) that the connection is permitted (step S119).

In the audio signal receiving apparatus 20 which establishes a connection to the audio signal transmitting apparatus 10, a reproducible sound source is selected to reproduce an audio signal (step S121).

By the procedures described above, the audio signal receiving apparatus 20 is connected to the audio signal transmitting apparatus 10. In the connecting process according to the embodiment, since the audio signal receiving apparatus 20 starts the connecting process to the audio signal transmitting apparatus 10 the moment the power supply is turned on without waiting for an operation by a user, a user of the audio signal receiving apparatus 20 can easily perform connection to the audio signal transmitting apparatus 10.

(Connection Confirming Process of Audio Signal Transmitting Apparatus)

Figure 12:
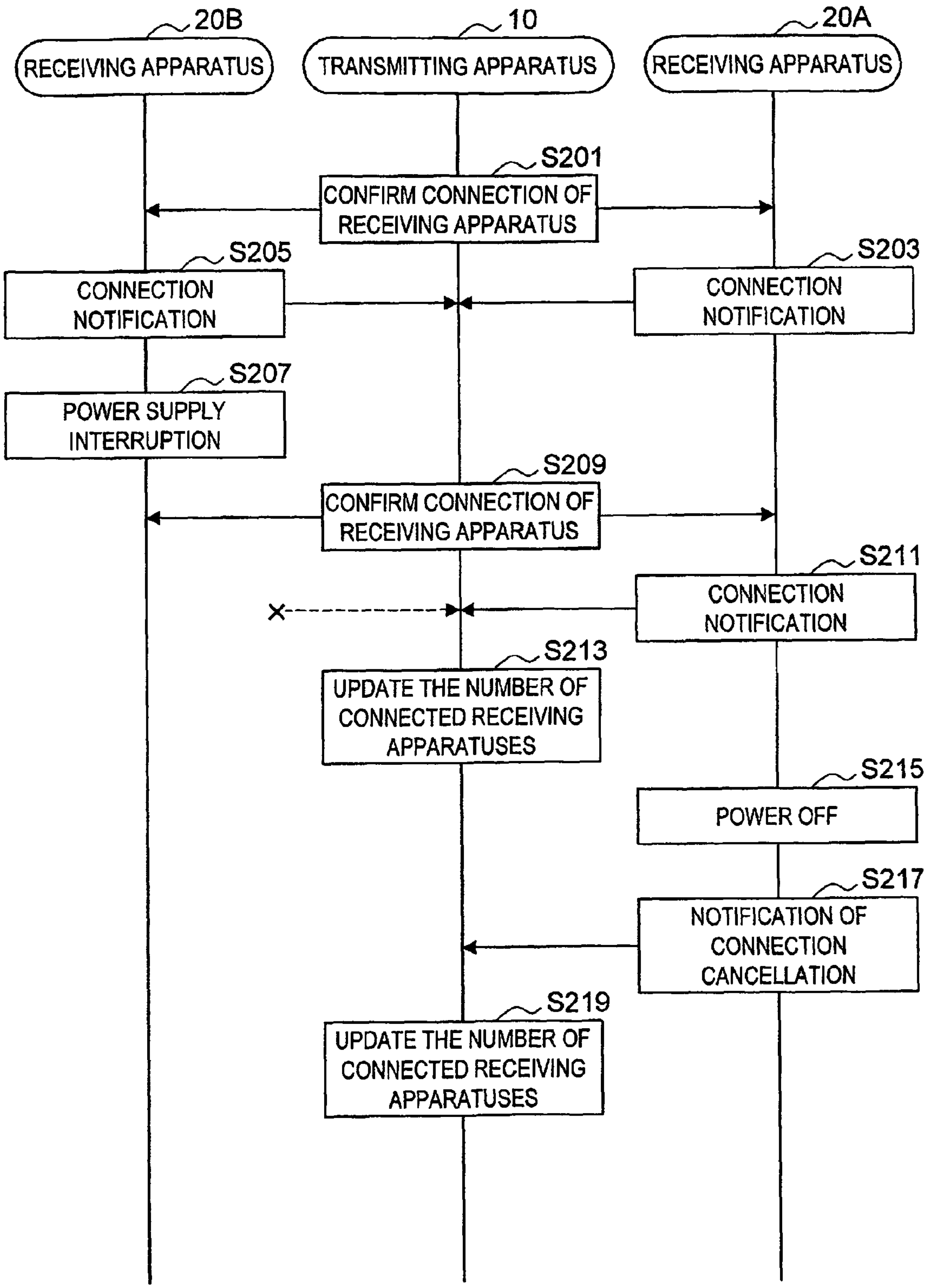
FIG. 12 is a flow chart showing a flow of connection confirming processes executed by an audio signal transmitting apparatus 10 according to the embodiment.

A connection confirming process of the audio signal receiving apparatus 20 which is executed by the audio signal transmitting apparatus 10 will be described below in detail with reference to FIG. 12. FIG. 12 is a flow chart showing a flow of the connection confirming process executed by the audio signal transmitting apparatus 10 according to the embodiment.

The audio signal transmitting apparatus 10, as described above, performs connection confirmation to the audio signal receiving apparatus 20 at predetermined time intervals (for example, every minute) to determine whether a connection to the audio signal receiving apparatus 20 is maintained. The connection confirming process will be described below in detail. In the following description, it is assumed that two audio signal receiving apparatuses 20A and 20B are connected to the audio signal transmitting apparatus 10.

The connection state management unit 180 of the audio signal transmitting apparatus 10 transmits connection confirmation signals to confirm the connection states to the connected audio signal receiving apparatuses 20A and 20B (step S201). The audio signal receiving apparatuses 20A and 20B which receive the connection confirmation signals transmit connection state notification signals as responses to the received connection confirmation signals and notify that the audio signal receiving apparatuses 20A and 20B are connected (steps S203 and S205).

When the audio signal transmitting apparatus 10 receives the connection state notification signal from the audio signal receiving apparatus 20, the process of maintaining the connection state is performed. For this reason, the connection state management unit 180 does not change the connection state, and a change in CH mapping and generation of new CH mapping information are not performed in the CH mapping unit 160.

In this state, it is considered that, at a certain point of time, a power supplied to the audio signal receiving apparatus 20B is interrupted (step S207) to turn off the power supply of the audio signal receiving apparatus 20B.

A predetermined period of time (for example, about 1 minute) has elapsed after a previous connection confirming signal is transmitted (in FIG. 8, a point of time of step S201), the audio signal transmitting apparatus 10 transmits the next connection confirming signal to confirm the connections of the audio signal receiving apparatuses 20A and 20B (step S209).

In this case, the connection state notification signal is transmitted from the audio signal receiving apparatus 20A (step S211). However, the audio signal receiving apparatus 20B in which the power supply is cut off and turned off does not transmit the connection state notification signal.

In the audio signal transmitting apparatus 10, since the connection state notification signal is not transmitted from the audio signal receiving apparatus 20B in which a connection relationship is maintained at the previous confirmation, the connection to the audio signal receiving apparatuses 20A and 20B is canceled, and the connection state management unit

180 updates the number of audio signal receiving apparatuses being in connection states (step S213).

Thereafter, the power supply is turned off through authentic processes by the user of the audio signal receiving apparatus 20A (step S215), the audio signal receiving apparatus 20A transmits a connection cancellation notice from the connection state transmitting unit 265 to the audio signal transmitting apparatus 10 as part of the shutdown process (step S217), and the power supply of the audio signal receiving apparatus 20A is turned off.

In the audio signal transmitting apparatus 10, in response to the connection cancellation notice from the audio signal receiving apparatus 20A, the audio signal transmitting apparatus 10 cancels the connection with the audio signal receiving apparatus 20A, and the connection state management unit 180 updates the number of audio signal receiving apparatuses in connection states (step S219).

In the audio signal transmission system 1 according to the embodiment, since the processes are automatically performed at predetermined time intervals, maintenance or cancellation of connection between the audio signal transmitting apparatus 10 and the audio signal receiving apparatus 20 can be automatically processed.

(Channel Allocating Process)

Figure 13:
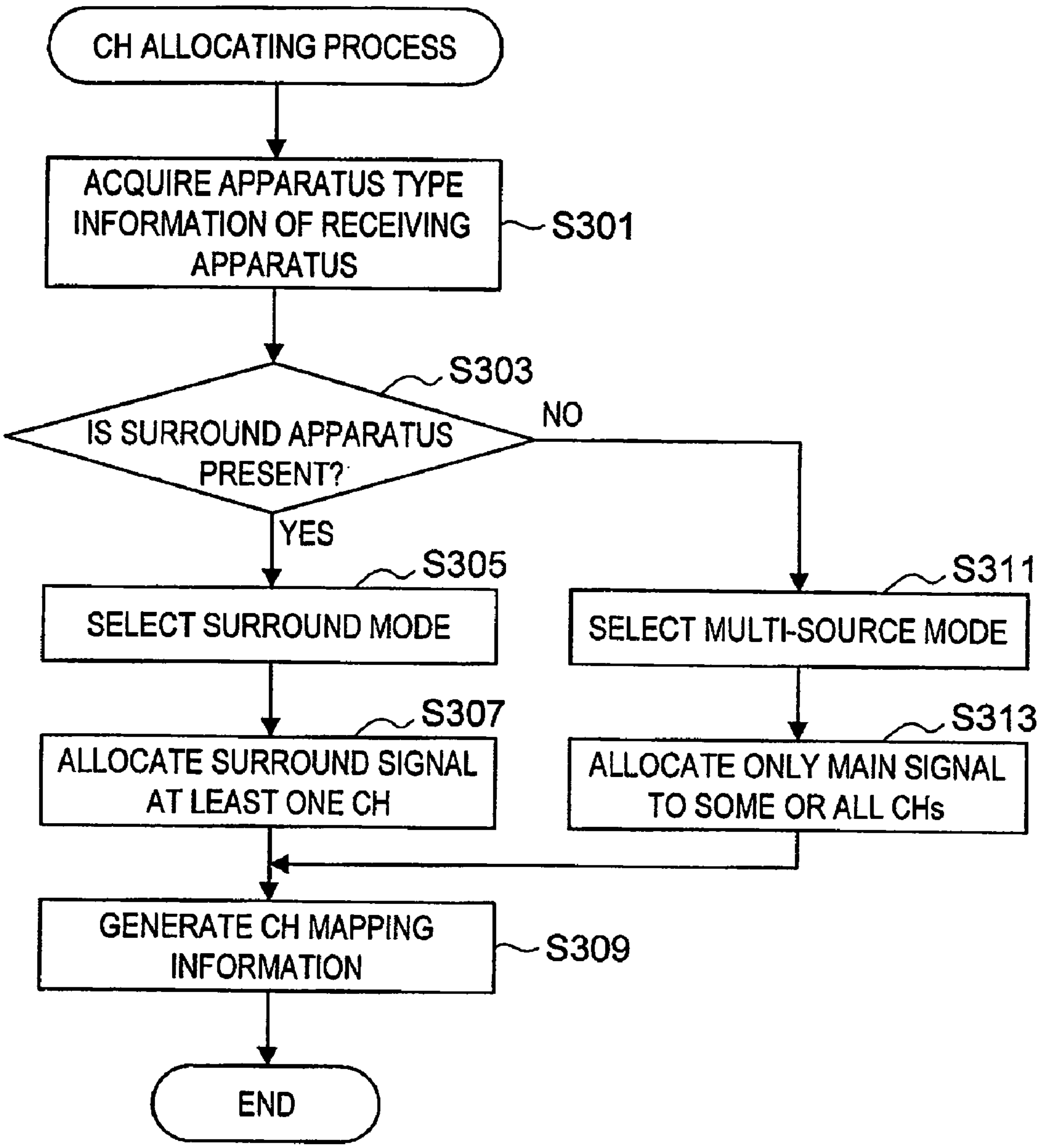
FIG. 13 is a flow chart showing a flow of a CH allocating process in the audio signal transmitting apparatus according to the embodiment.

A flow of a channel (CH) allocating process in the audio signal transmitting apparatus 10 according to the embodiment will be described below with reference to FIG. 13. FIG. 13 is a flow chart showing a flow of the CH allocating process in the audio signal transmitting apparatus 10 according to the embodiment.

As shown in FIG. 13, in the CH allocating process, the apparatus type information acquiring unit 181 of the audio signal transmitting apparatus 10 acquires apparatus type information related to a apparatus type of the receiving apparatus from the audio signal receiving apparatus 20 (step S301). In the audio signal transmitting apparatus 10 which acquires the apparatus type information, the connection apparatus information generating unit 186 generates connection apparatus information.

The connection state management unit 180, on the basis of the generated connection apparatus information, determines whether a surround apparatus which can output an audio signal transmitted from the audio signal transmitting unit 171 is present (step S303).

As a result of the determination, when it is determined that the surround apparatus is present, the transmitting scheme selecting unit 161 selects a surround mode (first transmitting scheme) (step S305). In this case, the CH allocating unit 163 of the channel mapping unit 160 allocates a surround signal to at least one channel such that the transmitting scheme of the audio signal is the surround mode (step S307). Furthermore, the CH mapping information generating unit 165 generates channel mapping information on the basis of a result (step S307) of channel allocation by the CH allocating unit 163 (step S309).

On the other hand, as a result of the determination in step S303, it is determined that the surround apparatus is absent, the transmitting scheme selecting unit 161 selects the multi-source mode (second transmitting scheme) (step S311). In this case, the CH allocating unit 163 of the channel mapping unit 160 allocates only main signals to some or all of a plurality of channels such that the transmitting scheme of the audio signal is the multi-source mode (step S313). Furthermore, the CH mapping information generating unit 165 generates channel mapping information on the basis of the result (step S313) of channel allocation by the CH allocating unit 163 (step S309).

In this manner, although the audio signal transmitting apparatus 10 performs the channel allocating process, when the surround mode is selected as the transmitting scheme of the audio signal, the CH allocating unit 163 can preferentially allocate the surround signal when a new surround signal is allocated. More specifically, for example, the CH allocating unit 163, as described above, secures the channels the number of which is equal to the number of surround apparatuses. Thereafter, the remaining channels can also be allocated to the main apparatuses. When the surround mode is selected, the CH allocating unit 163 allocates the channels. In this case, when the surround apparatus is not connected to the audio signal transmitting apparatus 10, excessive channels can be allocated to the main apparatuses. Therefore, according to the embodiment, the allocation of the channels by the CH allocating unit 163 can be dynamically changed depending on the types and number of audio signal receiving apparatuses 20, so that the channels included in the audio signal transmitting apparatus 10 can be effectively used.

(Channel Allocating Process in Surround Mode)

Figure 14:
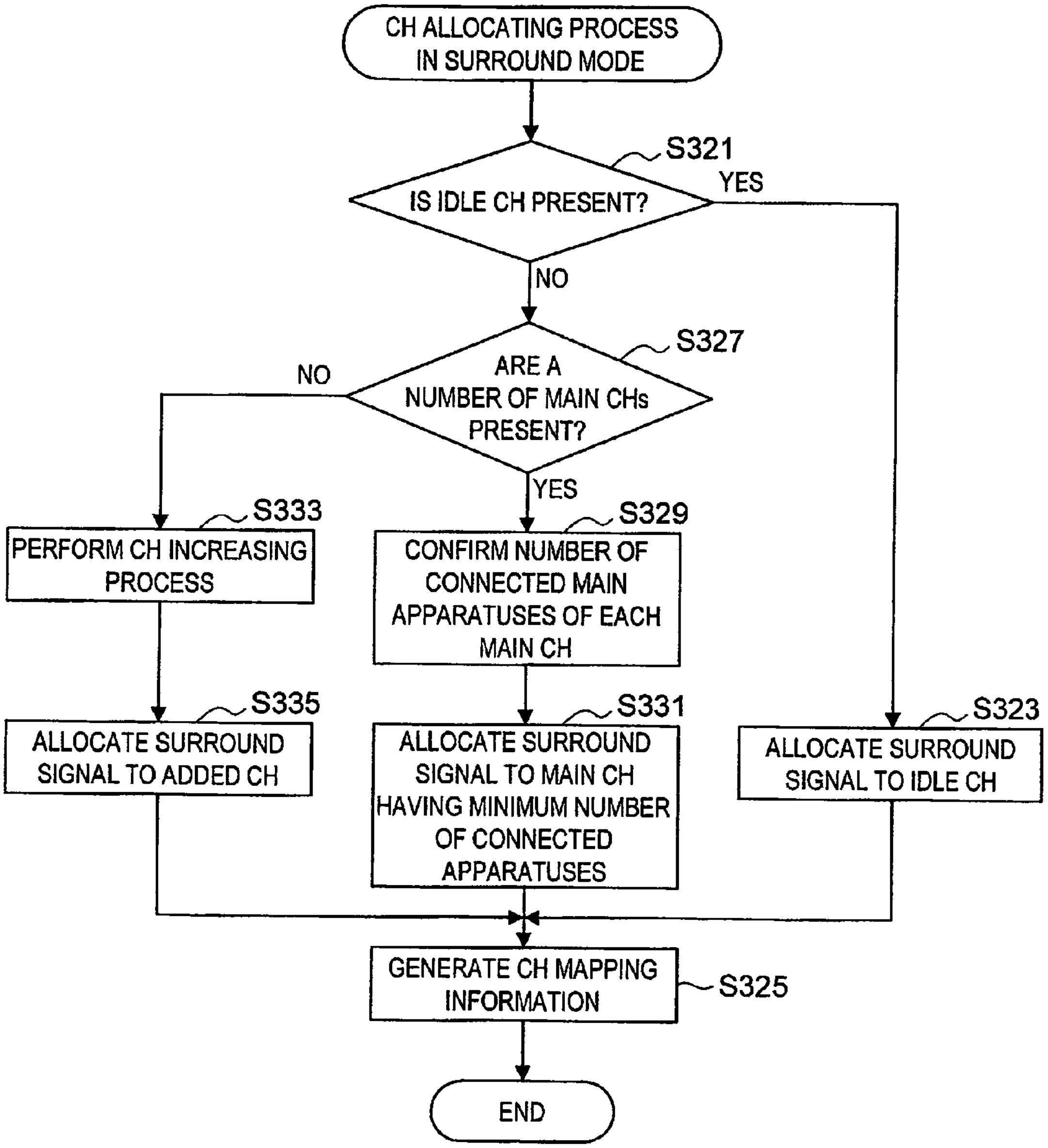
FIG. 14 is a flow chart showing a flow of a CH allocating process in a surround mode by the audio signal transmitting apparatus according to the embodiment.
Figure 16:
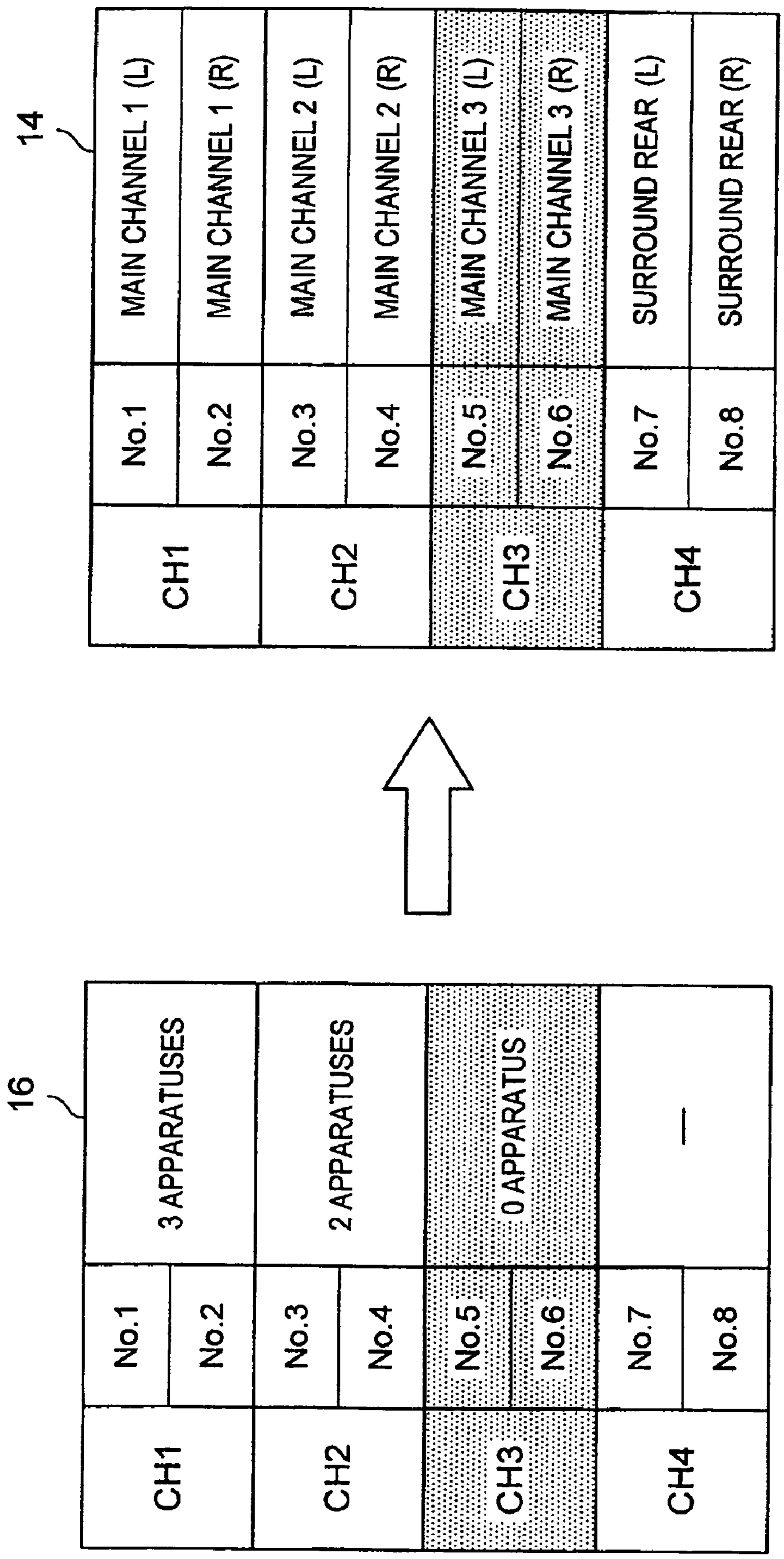
FIG. 16 is an explanatory diagram showing details of processes shown in FIG. 15B.

A flow of a channel allocating process in the surround mode will be described below in detail with reference to FIGS. 14 to 16. FIG. 14 is a flow chart showing the flow of the channel allocating process in the surround mode performed by the audio signal transmitting apparatus 10 according to the embodiment. FIGS. 15A and 15B are explanatory diagrams for explaining a change of channel mapping information according to the embodiment. FIG. 16 is an explanatory diagram showing details of the process shown in FIG. 15B. In this case, a case in which new surround signal is allocated will be exemplified.

As shown in FIG. 14, in the CH allocating process in the surround mode, the CH allocating unit 163, on the basis of the CH mapping information, determines whether an idle channel to which an audio signal is not allocated is present (step S321).

For example, as shown in FIG. 15A, it is assumed that a main signal “main channel 1” is allocated to CH1, that a main signal “main channel 2” is allocated to CH2, that a surround signal corresponding to a “surround rear speaker” is allocated to CH3, and that CH4 is unused. In this case, when the surround back speaker is to be newly connected, a surround signal corresponding to a “surround back speaker” needs to be allocated to any channel.

As shown in the example in FIG. 15A, when it is determined as a result of the determination in step S321 that an idle channel (“CH4” in the example in FIG. 15A) is present, the CH allocating unit 163 allocates a surround signal (surround signal for surround back speaker in the example in FIG. 15A) to the idle channel (CH4) (step S323). As a result, the channel mapping is set in the state shown in a lower-half part in FIG. 15A, and the CH mapping information generating unit 165 generates CH mapping information as shown in the lower-half part in FIG. 15A (step S325). In this manner, according to the CH allocating process in the surround mode according to the embodiment, an unused channel is effectively used as a channel for surround signal.

On the other hand, for example, as shown in FIG. 15B, it is assumed that a main signal “main channel 1” is allocated to CH1, that a main signal “main channel 2” is allocated to CH2, that a main signal “main channel 3” is allocated to CH3, and that a surround signal corresponding to a “surround rear speaker” is allocated to CH4. In this case, when a surround back speaker is to be newly connected, the surround signal corresponding to the “surround back speaker” needs to be allocated to any channel.

As shown in the example in FIG. 15B, as a result of the determination in step S321, when it is determined that an idle channel is absent, the CH allocating unit 163 determines on the basis of the CH mapping information whether a plurality of main channels are present (step S327).

As a result of the determination in step S327, as shown in the example in FIG. 15B, it is determined that a plurality of main CHs (CH1 to CH3) are present, the output apparatus confirmation unit 193 of the channel management unit 190 confirms the number of connections (i.e., the number of main apparatuses which output audio signals transmitted from the CHs) of the main apparatuses connected to the main CHs (CH1 to CH3) (step S329).

The process in step S329 will be described with reference to the example shown in FIG. 16. The CH mapping information in the example in FIG. 15B is given by CH mapping information 14 shown in the right-half part in FIG. 16. In this case, the output apparatus confirmation unit 193 confirms the number of connections of the main apparatuses connected to the main CHs (CH1 to CH3) on the basis of the connection apparatus information or the like acquired from the connection apparatus information generating unit 186. As a result, as in information 16 related to the number of main apparatus connections shown in the left-half part in FIG. 16, it is assumed that three main apparatuses are connected to CH1, two main apparatuses are connected to CH2, and no main apparatus is connected to CH3. In this case, the number of main apparatuses (the number of output main apparatuses) to which CH3 is connected is minimum (0 main apparatus). Therefore, the output apparatus confirmation unit 193 notifies the CH allocating unit 163 that CH3 to which the main signal "main channel 3" is allocated has the smallest number of output main apparatuses. The CH allocating unit 163 which receives the notice cancels allocation of a main signal (main channel 3) in the channel "CH3" having the smallest number of output main apparatuses, and newly allocates a surround signal corresponding to the surround back speaker to CH3 (step S331).

As a result, the channel mapping is set in the state shown in the lower-half part in FIG. 15B, and the CH mapping information generating unit 165 generates the CH mapping information as shown in the lower-half part in FIG. 15B (step S325). In this manner, according to the CH allocating process in the surround mode according to the embodiment, even though an idle channel is absent, a new surround signal can be allocated while minimizing an influence on the operation of the main apparatus which outputs an audio signal transmitted from the main channel.

As a result of the determination in step S327, when it is determined that only one main CH is present, the CH allocating unit 163 requests the CH number changing unit 195 of the channel management unit 190 to perform a process of increasing the number of channels. The CH number changing unit 195 which receives the request performs a CH increasing process (step S333). After the CH increasing process, the CH allocating unit 163 allocates a new surround signal to an added channel (step S335), and the CH mapping information generating unit 165 generates CH mapping information on the basis of the allocation result (step S325).

In the example described above, even though the plurality of main CHs are present, the channel number increasing process may be performed. Even though the number of main CHs is one, allocation of a main signal in the main CH may be canceled, and a new surround signal may be allocated.

It should be understood by those skilled in the art that various modifications, combinations, sub-combinations and alterations may occur depending on design requirements and other factors insofar as they are within the scope of the appended claims or the equivalents thereof.

For example, the embodiments described above describe the case in which a 4-channel stereo system including 4 channels is used. However, the number of channels is not limited to the number described above, and 4 or more channels may be used. Since the number of settable channels depends on the processing capability of a CPU or a DSP arranged in the audio signal transmitting apparatus or the audio signal receiving apparatus, the numbers of channels can be changed depending on the processing capabilities of these processors.

What is claimed is:

1. An audio signal transmitting apparatus which transmits audio signals to external connection apparatuses through a plurality of channels, comprising:

a channel mapping unit which determines the audio signals allocated to each of the channels and generates channel mapping information representing types of the audio signals allocated to each of the channels;

an audio signal transmitting unit which transmits the audio signals allocated to each of the channels by the channel mapping unit to the external connection apparatuses by a first transmitting scheme or a second transmitting scheme; and a connection management information providing unit which provides connection management information including the channel mapping information and transmitting scheme information representing the transmitting scheme of the audio signals to the external connection apparatuses, and wherein the plurality of audio signals acquired from one audio source includes one main signal and one or two or more surround signals corresponding to a surround component of an audio output obtained by the main signal, the first transmitting scheme is a transmitting scheme which allocates the surround signal to at least one of the channels to transmit the surround signal, and the second transmitting scheme is a transmitting scheme which allocates only the main signals to some or all of the plurality of channels to transmit the main signals.

2. The audio signal transmitting apparatus according to claim 1, wherein the channel mapping unit includes:

a transmitting scheme selecting unit which selects any one of the first transmitting scheme and the second transmitting scheme depending on a type of the external connection apparatus which can output the audio signal transmitted by the audio signal transmitting unit;

a channel allocating unit which allocates the surround signal to at least one of the channels when the first transmitting scheme is selected by the transmitting scheme selecting unit, and allocates only the main signal to some or all of the plurality of channels when the second transmitting scheme is selected by the transmitting scheme selecting unit; and a channel mapping information generating unit which generates the channel mapping information based on a result of allocation of the audio signal to each of the channels by the channel allocating unit.

3. The audio signal transmitting apparatus according to claim 2, further comprising:

a connection state managing unit having:

an apparatus type information acquiring unit which acquires apparatus type information representing whether the external connection apparatus is a main apparatus which can output the main signal or surround apparatuses of one type or two or more types which can output the surround signal, a connection apparatus information generating unit which generates connection apparatus information including the number of types of external connection apparatuses which can output the audio signal transmitted by the audio signal transmitting unit based on the apparatus type information, and a connection state determining unit which determines whether the surround apparatus which can output the audio signal transmitted by the audio signal transmitting unit is present based on the connection apparatus information, wherein the transmitting scheme selecting unit selects the first transmitting scheme when the connection state managing unit determines that the surround apparatus is present, and the transmitting scheme selecting unit selects the second transmitting scheme when the connection state managing unit determines that the surround apparatus is absent.

4. The audio signal transmitting apparatus according to claim 3, wherein when the first transmitting scheme is selected by the transmitting scheme selecting unit, the connection state determining unit supplies the connection apparatus information acquired from the connection apparatus information generating unit to the channel allocating unit, and the channel allocating unit preferentially allocates one or two or more of the surround signals which can be output by the surround apparatuses depending on the number of surround apparatuses which can output the audio signals transmitted by the audio signal transmitting unit and included in the connection apparatus information.

5. The audio signal transmitting apparatus according to claim 4, wherein the connection state managing unit further has a connection state receiving unit which receives a connection state notification signal representing whether the external connection apparatus is connected to the audio signal transmitting apparatus from the external connection apparatus at a predetermined timing.

6. The audio signal transmitting apparatus according to claim 5, wherein the connection state managing unit further has a connection confirmation signal transmitting unit which transmits a connection confirmation signal which confirms whether the external connection apparatus is connected to the audio signal transmitting apparatus to all the external connection apparatuses connected to the audio signal transmitting apparatus, and the connection state receiving unit receives the connection state notification signal representing that the external connection apparatus is connected to the audio signal transmitting apparatus from the external connection apparatus which responds to the connection confirmation signal.

7. The audio signal transmitting apparatus according to claim 6, wherein the connection confirmation signal transmitting unit periodically transmits the connection confirmation signal.

8. The audio signal transmitting apparatus according to claim 5, wherein the predetermined timing is a timing when a power supply of the external connection apparatus is turned on.

9. The audio signal transmitting apparatus according to claim 5, wherein the predetermined timing is a timing when a power supply of the external connection apparatus is turned off.

10. The audio signal transmitting apparatus according to claim 4, wherein the channel allocating unit allocates the surround signals to the channels the number of which is equal to the number of surround apparatuses which can output the audio signals transmitted by the audio signal transmitting unit and allocates the main signal to the channel to which the surround signal is not allocated.

11. The audio signal transmitting apparatus according to claim 10, wherein the channel allocating unit, when a new surround signal is allocated to the channel, based on the channel mapping information acquired from the channel mapping information generating unit, determines the presence/absence of an idle channel serving as the channel to which the audio signal is not allocated, and allocates the new surround signal to one of the channels to which the main signal is allocated when it is determined that the idle channel is absent.

12. The audio signal transmitting apparatus according to claim 11, further comprising a channel managing unit which, when a plurality of main channels are the channels to which the main signals are allocated, based on the connection apparatus information acquired from the connection apparatus information generating unit, confirms the number of main apparatuses which output the audio signals transmitted from the main channels and notifies the channel allocating unit of the channel having a smallest number of main apparatuses, and wherein the channel allocating unit allocates the new surround signal to the channel of which is notified by the channel managing unit.

13. The audio signal transmitting apparatus according to claim 10, further comprising a channel managing unit which changes the number of channels depending on a request from the channel allocating unit, the channel allocating unit, when the new surround signal is allocated to the channel, based on the channel mapping information acquired from the channel mapping information generating unit, determines the presence/absence of an idle channel serving as the channel to which the audio signal is not allocated, and requests the channel managing unit to increase the number of channels when it is determined that the idle channel is absent, and the channel managing unit increases the number of channels depending on a request from the channel allocating unit.

14. The audio signal transmitting apparatus according to claim 5, wherein when the connection state receiving unit receives the connection state notification signal representing that the external connection apparatus is connected to the audio signal transmitting apparatus from the external connection apparatus, the connection state determining unit determines whether the surround apparatuses which can output the audio signals transmitted by the audio signal transmitting unit includes a channel-unallocated apparatus in which the audio signals which can be output are not allocated to any one of the plurality of channels, and the channel allocating unit, when the connection state determining unit determines that the channel-unallocated apparatus is present, preferentially allocates the surround signal which can be output by the channel-unallocated apparatus to the channel.

15. The audio signal transmitting apparatus according to claim 4, wherein the channel allocating unit allocates the main signal to at least one of the channels.

16. An audio signal receiving apparatus which receives audio signals transmitted from an external connection apparatus through a plurality of channels, comprising:

a connection management information acquiring unit which acquires connection management information including channel mapping information representing types of the audio signals allocated to each of the channels and transmitting scheme information representing a transmitting scheme of the audio signals by the external connection apparatuses from the external connection apparatus;

a connection permission/nonpermission determining unit which determines, based on the transmitting scheme information, whether the transmitting scheme is a scheme in which the audio signal receiving apparatus is connected to the external connection apparatus;

an audio signal receiving unit which receives the audio signals from the external connection apparatuses when the connection permission/nonpermission determining unit determines that the transmitting scheme is the scheme in which the audio signal receiving apparatus is connected to the external connection apparatus; and an audio signal output unit which selects and outputs the audio signals which can be output based on the channel mapping information.

17. The audio signal receiving apparatus according to claim 16, wherein the plurality of audio signals acquired from one audio source include one main signal and one or two surround signals corresponding to a surround component of an audio output obtained by the main signal, and the audio signal transmitting apparatus further includes an apparatus type information providing unit which provides apparatus type information representing whether the audio signal transmitting apparatus is a main apparatus which can output the main signal or surround apparatus of one type or two or more types which can output the surround signals.

18. The audio signal receiving apparatus according to claim 17, further comprising a connection state transmitting unit which transmits a connection state notification signal representing whether the audio signal receiving apparatus is connected to the external connection apparatus at a predetermined timing.

19. The audio signal receiving apparatus according to claim 18, further comprising a connection confirmation signal receiving unit which receives a connection confirmation signal which confirms whether the audio signal receiving apparatus is connected to the external connection apparatus from the external connection apparatus, and wherein the connection state transmitting unit may transmit the connection state notification signal representing that the audio signal receiving apparatus is connected to the external connection apparatus as a response to the connection confirmation signal.

20. The audio signal receiving apparatus according to claim 17, wherein the predetermined timing is a timing when a power supply of the audio signal receiving apparatus is turned on.

21. The audio signal receiving apparatus according to claim 17, wherein the predetermined timing is a timing when a power supply of the audio signal receiving apparatus is turned off.

22. An audio signal transmission system comprising: an audio signal transmitting apparatus which transmits audio signals to external connection apparatuses through a plurality of channels; and an audio signal receiving apparatus which receives the audio signals transmitted from the audio signal transmitting apparatus, wherein an audio signal transmitting apparatus includes:

a channel mapping unit which determines the audio signals allocated to each of the channels and generates channel mapping information representing types of the audio signals allocated to each of the channels;

an audio signal transmitting unit which transmits the audio signals allocated to each of the channels by the channel mapping unit to the external connection apparatuses by a first transmitting scheme or a second transmitting scheme; and a connection management information providing unit which provides connection management information including the channel mapping information and transmitting scheme information representing the transmitting scheme of the audio signals to the external connection apparatuses, the audio signal receiving apparatus includes:

a connection management information acquiring unit which acquires connection management information including the channel mapping information representing types of the audio signals allocated to each of the channels and transmitting scheme information representing a transmitting scheme of the audio signals by the external connection apparatuses from the audio signal transmitting apparatus;

a connection permission/nonpermission determining unit which determines, based on the transmitting scheme information, whether the transmitting scheme is a scheme in which the audio signal receiving apparatus is connected to the external connection apparatuses;

an audio signal receiving unit which receives the audio signals from the external connection apparatuses when the connection permission/nonpermission determining unit determines that the transmitting scheme is the scheme in which the audio signal receiving apparatus is connected to the external connection apparatuses; and an audio signal output unit which selects and outputs the audio signals which can be output from the received audio signals based on the channel mapping information, the plurality of audio signals acquired from one audio source includes one main signal and one or two or more surround signals corresponding to a surround component of an audio output obtained by the main signal, the first transmitting scheme is a transmitting scheme which allocates the surround signal to at least one of the channels to transmit the surround signal, and the second transmitting scheme is a transmitting scheme which allocates only the main signals to some or all of the plurality of channels to transmit the main signals.

23. An audio signal transmission method in an audio signal transmission system which includes an audio signal transmitting apparatus which transmits audio signals to external connection apparatuses through a plurality of channels and an audio signal receiving apparatus which receives the audio signals transmitted from the audio signal transmitting apparatus, comprising the steps of:

determining the audio signals allocated to each of the channels;

generating channel mapping information representing types of the audio signals allocated to each of the channels;

providing connection management information including the channel mapping information and transmitting scheme information representing a transmitting scheme of the audio signal;

determining whether the transmitting scheme is a scheme in which the audio signal receiving apparatus can be connected to the audio signal transmitting apparatus based on the transmitting scheme information;

transmitting the audio signals allocated to each of the channels by the channel mapping unit to the external connection apparatus by a first transmitting scheme or a second transmitting scheme, when it is determined that the transmitting scheme is the scheme in which the audio signal receiving apparatus can be connected to the audio signal transmitting apparatus;

receiving the audio signals from the audio signal transmitting apparatus; and selecting the audio signal which can be output from the received audio signals based on the channel mapping information and to output the audio signal.

24. A computing system including a program to cause a computer to function as an audio signal transmitting apparatus which transmits audio signals to external connection apparatuses through a plurality of channels, and a processor that, when implementing the program, causes the computer to realize:

a channel mapping function that determines the audio signals allocated to each of the channels and generates channel mapping information representing types of the audio signals allocated to each of the channels;

an audio signal transmitting function that transmits the audio signals allocated to each of the channels by the channel mapping function to the external connection apparatus by a first transmitting scheme or a second transmitting scheme; and a connection management information providing function that provides connection management information including the channel mapping information and transmitting scheme information representing a transmitting scheme of the audio signals to the external connection apparatus.

25. A computing system including a program to cause a computer to function as an audio signal receiving apparatus which receives audio signals transmitted from external connection apparatuses through a plurality of channels, a processor that, when implementing the program, causes the computer to realize:

a connection management information acquiring function that acquires connection management information including channel mapping information representing types of the audio signals allocated to each of the channels and transmitting scheme information representing a transmitting scheme of the audio signals obtained by the external connection apparatuses from the external connection apparatuses;

a connection permission/nonpermission determining function that determines whether the transmitting scheme is a scheme in which the audio signal receiving apparatus can be connected to the external connection apparatuses based on the transmitting scheme information; and an audio signal output function that, when the connection permission/nonpermission determining unit determines that the transmitting scheme is the scheme in which the audio signal receiving apparatus can be connected to the external connection apparatuses, receives the audio signals from the external connection apparatuses; and an audio signal output function that selects the audio signal which can be output based on the channel mapping information and outputs the audio signal.

* * * * *